United States Patent
Black et al.

(10) Patent No.: US 10,439,715 B2
(45) Date of Patent: Oct. 8, 2019

(54) MASSIVELY MULTI-USER MIMO USING SPACE TIME HOLOGRAPHY

(71) Applicant: Elwha LLC, Bellevue, WA (US)

(72) Inventors: Eric J. Black, Bothell, WA (US); Brian Mark Deutsch, Snoqualmie, WA (US); Alexander Remley Katko, Bellevue, WA (US); Melroy Machado, Seattle, WA (US); Jay Howard McCandless, Alpine, CA (US); Yaroslav A. Urzhumov, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 308 days.

(21) Appl. No.: 15/409,394

(22) Filed: Jan. 18, 2017

(65) Prior Publication Data

US 2018/0006376 A1    Jan. 4, 2018

Related U.S. Application Data

(60) Provisional application No. 62/357,754, filed on Jul. 1, 2016.

(51) Int. Cl.
*H04B 10/116* (2013.01)
*H04B 7/0452* (2017.01)
(Continued)

(52) U.S. Cl.
CPC ......... *H04B 10/116* (2013.01); *H01Q 15/002* (2013.01); *H01Q 25/007* (2013.01); *H04B 7/0452* (2013.01)

(58) Field of Classification Search
CPC .................. H04B 10/11–118; H04B 7/0452
See application file for complete search history.

(56) References Cited

U.S. PATENT DOCUMENTS

| 5,208,653 | A | 5/1993 | Mark et al. |
| 6,876,337 | B2 | 4/2005 | Larry |

(Continued)

OTHER PUBLICATIONS

Dennis W. Prather, 5G Moves Into the Light: Holographic Massive MIMO, Toward Holographic RF Systems for Wireless Communications and Networks, IEEE ComSoc Technology News, Your #1 Source for Technology News, CTN Issue: Jun. 2016, Alan Gatherer, Editor in Chief, ComSoc Technology News, 5 pages, http://www.comsoc.org/ctn/5g-moves-into-light-holographic-massive-mimo.

(Continued)

*Primary Examiner* — Casey L Kretzer

(57) ABSTRACT

Disclosed are antenna systems, wireless antenna controllers, and related methods. An antenna system includes a configured to receive an electromagnetic (EM) signal and propagate the EM signal as an EM reference wave. The antenna system also includes a tunable EM scattering elements, and a wireless controller. A wireless antenna controller includes an EM emitter configured to emit EM radiation to EM filters. The EM filters are configured to pass different sub-ranges of a frequency range of the EM radiation to the tunable EM scattering elements. A method includes wirelessly controlling the tunable EM scattering elements to deliver a different information streams to different far-end locations. A method includes controlling the EM emitter to modulate frequency content of the EM radiation to cause the tunable EM scattering elements to operate collectively according to different modulation patterns.

37 Claims, 5 Drawing Sheets

(51) Int. Cl.
*H01Q 15/00* (2006.01)
*H01Q 25/00* (2006.01)

(56) References Cited

U.S. PATENT DOCUMENTS

| | | |
|---|---|---|
| 2002/0158798 A1 | 10/2002 | Chiang et al. |
| 2004/0162034 A1 | 8/2004 | Parker |
| 2007/0191064 A1 | 8/2007 | Skarby et al. |
| 2008/0048917 A1 | 2/2008 | Achour et al. |
| 2008/0052505 A1 | 2/2008 | Theobald |
| 2008/0054899 A1 | 3/2008 | Aksoy et al. |
| 2008/0204347 A1 | 8/2008 | Alvey et al. |
| 2009/0284431 A1 | 11/2009 | Meharry et al. |
| 2010/0301971 A1 | 12/2010 | Yonak et al. |
| 2011/0086598 A1 | 4/2011 | Ali et al. |
| 2012/0212328 A1 | 8/2012 | Blair et al. |
| 2013/0208332 A1 | 8/2013 | Yu et al. |
| 2013/0266319 A1 | 10/2013 | Bodan et al. |
| 2014/0056378 A1 | 2/2014 | Harel et al. |
| 2014/0128032 A1 | 5/2014 | Muthukumar |
| 2014/0211298 A1* | 7/2014 | Sayyah ............. H01Q 15/0086 359/298 |
| 2014/0231627 A1 | 8/2014 | Wakatsuki et al. |
| 2014/0266946 A1* | 9/2014 | Bily ................. H01Q 13/22 343/771 |
| 2014/0268436 A1 | 9/2014 | Du et al. |
| 2014/0306784 A1 | 10/2014 | Broyde et al. |
| 2015/0109181 A1 | 4/2015 | Hyde et al. |
| 2015/0162658 A1 | 6/2015 | Bowers et al. |
| 2016/0044296 A1 | 2/2016 | Sun et al. |
| 2016/0149312 A1* | 5/2016 | Henry ................ H01Q 21/00 343/893 |
| 2016/0190698 A1 | 6/2016 | Andresen et al. |
| 2016/0239060 A1 | 8/2016 | Koob et al. |
| 2017/0063344 A1 | 3/2017 | Broyde et al. |
| 2017/0163327 A1 | 6/2017 | Yang et al. |
| 2017/0229774 A1 | 8/2017 | Schuehler et al. |
| 2017/0351102 A1 | 12/2017 | Wertsberger |

OTHER PUBLICATIONS

Wei Ting Chen, Kuang-Yu Yang, Chih-Ming Wang, Yao-Wei Huang, Greg Sun, I-Da Chiang, Chun Yen Liao, Wei-Lun Hsu, Hao Tsun Lin, Shulin Sun, Lei Zhou, Al Qun Liu, and Din Ping Tsai, Nano Letters, High-Efficiency Broadband Meta-Hologram with Polarization-Controlled Dual Images, dx.doi.org/10.102/nl403811d | Nano Lett. 2014, 14, 225-230, Publication Date (Web): Dec. 13, 2013, 6 pages, pubs.acs.org/NanoLett.

Stèphane Larouche, Yu-Ju Tsai, Talmage Tyler, Nan M. Jokerst and David R. Smith, Nature Materials, Infrared metamaterial phase hologram Supplementary Information, Center for Metamaterials and Integrated Plasmonics, 3 pages, Department of Electrical and Computer Engineering, Pratt School of Engineering, Duke University, Box 90291, Durham, North Carolina 277087, USA, DOI: 10.1038/NMAT3278.

Stèphane Larouche, Yu-Ju Tsai, Talmage Tyler, Nan M. Jokerst and David R. Smith, Nature Materials, Infrared Metamaterial Phase Holograms, 5 pages, Articles Published Online: Mar. 18, 2012 | DOI: 10.1038/NMAT3278.

PCT International Search Report; International App. No. PCT/US2018/053759; Jan. 31, 2019; pp. 1-3.

\* cited by examiner

MASSIVELY MULTI-USER MIMO USING SPACE TIME HOLOGRAPHY

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

This application claims priority to U.S. Provisional Patent Application No. 62/357,754 to Eric J. Black et al., titled MASSIVELY MULTI-USER MIMO USING SPACE-TIME HOLOGRAPHY, and filed Jul. 1, 2016, the entire disclosure of which is hereby incorporated herein by this reference.

This application is related to and hereby incorporates by reference U.S. patent application Ser. No. 15/345,251 to Eric J. Black et al., titled MASSIVELY MULTI-USER MIMO USING SPACE TIME HOLOGRAPHY, and filed Nov. 7, 2016.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

DETAILED DESCRIPTION

Figure 1:
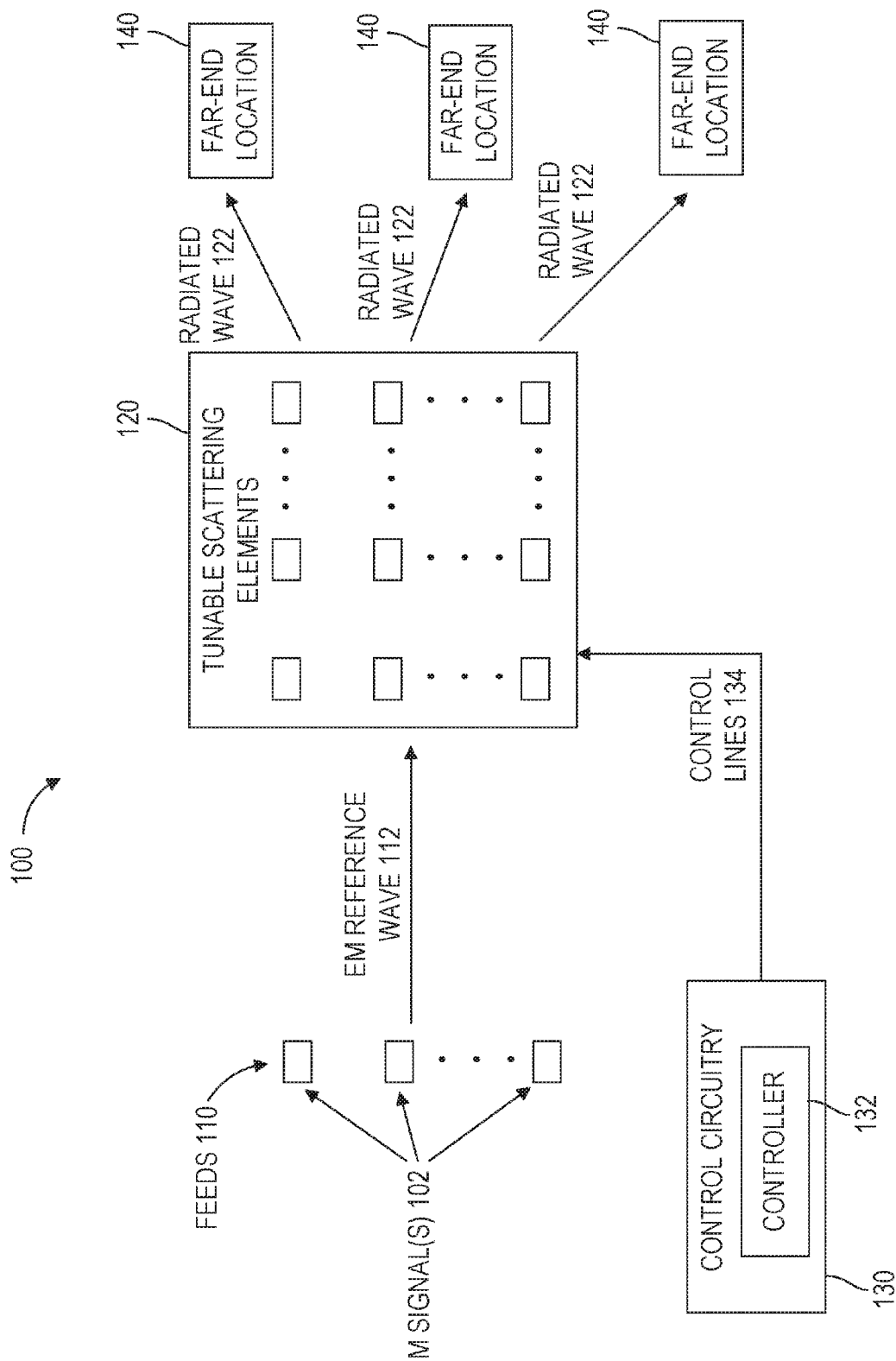
FIG. 1 is a simplified block diagram of an antenna system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

Embodiments of the disclosure include antenna systems and related methods for generating modulated signals by modulating electromagnetic (EM) scattering elements rather than by modulating EM signals fed to the EM scattering elements.

Various features disclosed herein may be applied alone or in combination with others of the features disclosed herein. These features are too numerous to explicitly indicate herein each and every other one of the features that may be combined therewith. Therefore, any feature disclosed herein that is practicable, in the view of one of ordinary skill, to combine with any other one or more others of the features disclosed herein, is contemplated herein to be combined. A non-exhaustive list of some of these disclosed features that may be combined with others of the disclosed features follows.

For example, in some embodiments, an antenna system comprises: one or more feeds configured to receive an electromagnetic (EM) signal and propagate the EM signal as an EM reference wave; a plurality of tunable EM scattering elements spaced at sub-wavelength distances, the plurality of tunable EM scattering elements configured to operate in at least two different operational states to selectively scatter the EM reference wave as a radiated wave; and control circuitry comprising a controller operably coupled to the plurality of tunable EM scattering elements and programmed to modulate the radiated wave over time to deliver a plurality of different information streams to a plurality of different far-end locations by modulating the plurality of tunable EM scattering elements between the plurality of different operational states over time.

In some embodiments, an antenna system includes one or more feeds configured to receive a monochromatic continuous wave EM signal.

In some embodiments, an antenna system includes one or more feeds configured to receive a modulated EM signal.

In some embodiments, an antenna system includes a controller programmed to control tunable EM scattering elements through control lines.

In some embodiments, an antenna system includes a controller programmed to control each of the tunable EM scattering elements individually through a separate control line.

In some embodiments, an antenna system includes a controller programmed to control each of tunable EM scattering elements individually through a combination of signals from at least two separate control lines.

In some embodiments, an antenna system includes control lines, wherein each of the control lines is isolated and decoupled from each of the other control lines.

In some embodiments, an antenna system includes a plurality of high frequency EM transmission lines operably coupling a controller to a plurality of tunable EM scattering elements, wherein the plurality of high-frequency EM transmission lines is configured to transmit EM waves having a frequency of at least about twice a frequency of a reference wave.

In some embodiments, an antenna system includes a plurality of high-frequency EM transmission lines including a plurality of optical transmission lines, and a plurality of tunable EM scattering elements including a plurality of optically tunable EM scattering elements tunable by optical signals transmitted through the plurality of optical transmission lines.

In some embodiments, an antenna system includes a plurality of optical transmission lines including a plurality of optical fibers.

In some embodiments, an antenna system includes a plurality of optically tunable EM scattering elements comprising a plurality of photodiodes.

In some embodiments, an antenna system includes a plurality of optically tunable EM scattering elements comprising a plurality of phototransistors.

In some embodiments, an antenna system includes a plurality of optically tunable EM scattering elements comprising a plurality of photoconductive or photoresistive elements.

In some embodiments, an antenna system includes a plurality of optically tunable EM scattering elements comprising a plurality of phase-change elements configured to change phase responsive to heat deposition of optical radiation.

In some embodiments, an antenna system includes a controller programmed to modulate a plurality of optically tunable EM scattering elements at a frequency of at least about one (1) gigahertz.

In some embodiments, an antenna system includes a controller programmed to modulate a plurality of optically tunable EM scattering elements at a time scale that is longer than a time that it takes for a radiated wave to travel from the plurality of optically tunable EM scattering elements to a plurality of different far-end locations.

In some embodiments, an antenna system includes a controller programmed to modulate a plurality of optically tunable EM scattering elements as a temporal series of modulation patterns, wherein each modulation pattern of the series is determined by solving a time invariant holographic projection manifold function.

In some embodiments, an antenna system includes a controller programmed to solve a time invariant holographic projection manifold function using a Green's function.

In some embodiments disclosed is an antenna system including a controller programmed to modulate a plurality of optically tunable EM scattering elements at a time scale that is shorter than a time that it takes for a radiated wave to travel from a plurality of optically tunable EM scattering elements to a plurality of different far-end locations.

In some embodiments, disclosed is an antenna system, wherein a controller is programmed to modulate a plurality of optically tunable EM scattering elements as a series of modulation patterns, wherein at least a portion of the modulation patterns of the series is determined by solving a time variant holographic projection manifold function.

In some embodiments, an antenna system includes a controller programmed to solve a time variant holographic projection manifold function using a retarded Green's function.

In some embodiments, two or more different operational states of a plurality of optically tunable EM scattering elements of an antenna system comprise more than two operational states.

In some embodiments, an antenna system includes a controller programmed to transition the antenna system between different holograms gradually.

In some embodiments, an antenna system includes a controller programmed to transition between different holograms by smoothing control signals delivered to a plurality of optically tunable EM scattering elements with smoothed Heaviside functions.

In some embodiments, an antenna system includes a controller programmed to transition between different holograms by smoothing control signals delivered to a plurality of optically tunable EM scattering elements with piecewise-trigonometric functions.

In some embodiments, an antenna system includes a controller programmed to transition between different holograms by smoothing control signals delivered to a plurality of optically tunable EM scattering elements with spline polynomial functions.

In some embodiments, an antenna system includes a controller programmed to modulate a radiated wave over time to deliver a plurality of different frequency modulated information streams to a plurality of different far-end locations.

In some embodiments, an antenna system includes a controller programmed to modulate a radiated wave over time to deliver a plurality of different amplitude modulated information streams to a plurality of different far-end locations.

In some embodiments, an antenna system includes a controller programmed to modulate a radiated wave over time to deliver a plurality of different phase modulated information streams to a plurality of different far-end locations.

In some embodiments, an antenna system includes a controller programmed to modulate a radiated wave over time to deliver a plurality of different quadrature amplitude modulated (QAM) data streams to a plurality of different far-end locations.

In some embodiments, an antenna system includes a controller programmed to modulate a radiated wave over time to deliver a plurality of different analog modulated information streams to a plurality of different far-end locations.

In some embodiments, an antenna system includes a controller programmed to modulate a radiated wave over time to deliver a plurality of different digital modulated data streams to a plurality of different far-end locations.

In some embodiments, an antenna system includes a controller programmed to modulate a radiated wave over time to deliver a plurality of different spread-spectrum modulated data streams to a plurality of different far-end locations.

In some embodiments, an antenna system includes a waveguide and a plurality of optically tunable EM scattering elements, which together comprise a metamaterial.

In some embodiments, at least some far-end locations of an antenna system coincide with EM receivers.

In some embodiments, at least two EM receivers of an antenna system comprise multiple input, multiple output (MIMO) receiver devices.

In some embodiments, at least two groups of at least two EM receivers of an antenna system comprise MIMO receiver devices.

In some embodiments, at least two EM receivers of an antenna system belong to two physically separate receiver devices.

In some embodiments, at least two groups of EM receivers of an antenna system, each having at least two receivers, belong to two physically separate receiver devices.

In some embodiments, an antenna system comprises a plurality of acoustic transmission lines operably coupling a controller to a plurality of tunable EM scattering elements, and the plurality of tunable EM scattering elements includes a plurality of acoustically tunable EM scattering elements tunable by acoustic signals transmitted through the plurality of acoustic transmission lines.

In some embodiments, a plurality of acoustically tunable EM scattering elements of an antenna system includes piezoelectric elements.

In some embodiments, a plurality of acoustically tunable EM scattering elements of an antenna system includes magnetostrictive elements.

In some embodiments, a plurality of acoustically tunable EM scattering elements of an antenna system includes microelectromechanical (MEM) elements.

In some embodiments, an antenna system includes a controller programmed to modulate a plurality of acoustically tunable EM scattering elements at a frequency of at least about one (1) gigahertz.

In some embodiments, an antenna system includes a controller programmed to modulate a plurality of acoustically tunable EM scattering elements at a time scale that is longer than a time that it takes for a radiated wave to travel from the plurality of acoustically tunable EM scattering elements to a plurality of different far-end locations.

In some embodiments, an antenna system includes a controller programmed to modulate a plurality of acoustically tunable EM scattering elements as a temporal series of modulation patterns, wherein each modulation pattern of the series is determined by solving a time invariant holographic projection manifold function.

In some embodiments, an antenna system includes a controller programmed to solve a time invariant holographic projection manifold functions using a Green's function.

In some embodiments, an antenna system includes a controller programmed to modulate a plurality of acoustically tunable EM scattering elements at a time scale that is shorter than a time that it takes for a radiated wave to travel from the plurality of acoustically tunable EM scattering elements to a plurality of different far-end locations.

In some embodiments, an antenna system includes a controller programmed to modulate a plurality of acoustically tunable EM scattering elements as a series of modulation patterns, wherein at least a portion of the modulation patterns of the series is determined by solving a time variant holographic projection manifold function.

In some embodiments, an antenna system includes a controller programmed to solve a time variant holographic projection manifold function using a retarded Green's function.

In some embodiments, two or more different operational states of each of a plurality of acoustically tunable EM scattering elements of an antenna system comprises more than two operational states.

In some embodiments, an antenna system includes a controller programmed to transition the antenna system between different holograms gradually.

In some embodiments, an antenna system includes a controller programmed to transition between different holograms by smoothing control signals delivered to a plurality of acoustically tunable EM scattering elements with smoothed Heaviside functions.

In some embodiments, an antenna system includes a controller programmed to transition between different holograms by smoothing control signals delivered to a plurality of acoustically tunable EM scattering elements with piecewise-trigonometric functions.

In some embodiments, an antenna system includes a controller programmed to transition between different holograms by smoothing control signals delivered to a plurality of acoustically tunable EM scattering elements with spline polynomial functions.

In some embodiments, an antenna system includes a controller programmed to modulate a radiated wave over time to deliver a plurality of different frequency modulated information streams to a plurality of different far-end locations.

In some embodiments, an antenna system includes a controller programmed to modulate a radiated wave over time to deliver a plurality of different amplitude modulated information streams to a plurality of different far-end locations.

In some embodiments, an antenna system includes a controller programmed to modulate a radiated wave over time to deliver a plurality of different phase modulated information streams to a plurality of different far-end locations.

In some embodiments, an antenna system includes a controller programmed to modulate a radiated wave over time to deliver a plurality of different quadrature amplitude modulated (QAM) data streams to the plurality of different far-end locations.

In some embodiments, an antenna system includes a controller programmed to modulate a radiated wave over time to deliver a plurality of different analog modulated information streams to the plurality of different far-end locations.

In some embodiments, an antenna system includes a controller programmed to modulate a radiated wave over time to deliver a plurality of different digital modulated data streams to the plurality of different far-end locations.

In some embodiments, an antenna system includes a controller programmed to modulate a radiated wave over time to deliver a plurality of different spread-spectrum modulated data streams to a plurality of different far-end locations.

In some embodiments, an antenna system includes a waveguide and a plurality of acoustically tunable EM scattering elements, which together comprise a metamaterial.

In some embodiments, at least some far-end locations of an antenna system coincide with EM receivers.

In some embodiments, an antenna system includes at least two EM receivers comprising multiple input, multiple output (MIMO) receiver devices.

In some embodiments, at least two groups of at least two EM receivers of an antenna system comprise MIMO receiver devices.

In some embodiments, at least two EM receivers of an antenna system belong to two physically separate receiver devices.

In some embodiments, at least two groups of EM receivers each having at least two receivers of an antenna system belong to two physically separate receiver devices.

In some embodiments, a method of operating an antenna system comprises: receiving and propagating an electromagnetic (EM) signal as an EM reference wave with one or more feeds; operating a plurality of tunable EM scattering elements spaced at sub-wavelength distances in at least two different operational states to selectively scatter the EM reference wave as a radiated wave; and modulating the radiated wave over time to deliver a plurality of different information streams to a plurality of different far-end locations by modulating the plurality of tunable EM scattering elements between the plurality of different operational states over time.

In some embodiments, receiving and propagating an EM signal comprises receiving and propagating a monochromatic continuous wave EM signal.

In some embodiments, receiving and propagating an EM signal comprises receiving and propagating a modulated EM signal.

In some embodiments, operating a plurality of tunable EM scattering elements comprises controlling the tunable EM scattering elements through control lines.

In some embodiments, modulating a plurality of tunable EM scattering elements comprises controlling each of the tunable EM scattering elements individually through a separate control line.

In some embodiments, operating a plurality of tunable EM scattering elements comprises controlling each of the tunable EM scattering elements individually through a combination of signals from at least two separate control lines.

In some embodiments, modulating a plurality of tunable EM scattering elements comprises controlling the tunable EM scattering elements through control lines isolated and decoupled from each of the others of the control lines.

In some embodiments, controlling a plurality of tunable EM scattering elements through the control lines comprises controlling the plurality of tunable EM scattering elements using a plurality of high frequency EM transmission lines, and using the plurality of high-frequency EM transmission lines to transmit EM waves having a frequency of at least about twice a frequency of the reference wave.

In some embodiments, controlling a plurality of tunable EM scattering elements using a plurality of high frequency EM transmission lines includes controlling the plurality of tunable EM scattering elements using a plurality of optical transmission lines, and wherein the plurality of tunable EM scattering elements includes a plurality of optically tunable EM scattering elements tunable by optical signals transmitted through the plurality of optical transmission lines.

In some embodiments, controlling a plurality of optically tunable EM scattering elements using a plurality of optical transmission lines comprises controlling the plurality of optically tunable EM scattering elements using a plurality of optical fibers.

In some embodiments, controlling a plurality of optically tunable EM scattering elements comprises controlling a plurality of photodiodes.

In some embodiments, controlling a plurality of optically tunable EM scattering elements comprises controlling a plurality of phototransistors.

In some embodiments, controlling a plurality of optically tunable EM scattering elements comprises controlling a plurality of photoconductive or photoresistive elements.

In some embodiments, controlling a plurality of optically tunable EM scattering elements comprises controlling a plurality of phase-change elements configured to change state responsive to heat deposition of optical radiation.

In some embodiments, controlling a plurality of optically tunable EM scattering elements comprises modulating the plurality of optically tunable EM scattering elements at a frequency of at least about one (1) gigahertz.

In some embodiments, controlling a plurality of optically tunable EM scattering elements comprises modulating the plurality of optically tunable EM scattering elements at a time scale that is longer than a time that it takes for a radiated wave to travel from the plurality of optically tunable EM scattering elements to a plurality of different far-end locations.

In some embodiments, modulating a plurality of optically tunable EM scattering elements comprises modulating the plurality of optically tunable EM scattering elements as a temporal series of modulation patterns, wherein each modulation pattern of the series is determined by solving a time invariant holographic projection manifold function.

In some embodiments, solving a time invariant holographic projection manifold function comprises solving the time invariant holographic projection manifold functions using a Green's function.

In some embodiments, controlling a plurality of optically tunable EM scattering elements comprises modulating the plurality of optically tunable EM scattering elements at a time scale that is shorter than a time that it takes for a radiated wave to travel from the plurality of optically tunable EM scattering elements to a plurality of different far-end locations.

In some embodiments, modulating a plurality of optically tunable EM scattering elements comprises modulating the plurality of optically tunable EM scattering elements as a series of modulation patterns, wherein at least a portion of the modulation patterns of the series is determined by solving a time variant holographic projection manifold function.

In some embodiments, modulating a plurality of optically tunable EM scattering elements as a series of modulation patterns comprises solving a time variant holographic projection manifold function using a retarded Green's function.

In some embodiments, operating a plurality of tunable EM scattering elements in at least two different operational states comprises operating the plurality of tunable EM scattering elements in more than two operational states.

In some embodiments, a method comprises transitioning an antenna system between different holograms gradually.

In some embodiments, transitioning an antenna system between different holograms gradually comprises transitioning between the different holograms by smoothing control signals delivered to a plurality of optically tunable EM scattering elements with smoothed Heaviside functions.

In some embodiments, transitioning an antenna system between different holograms gradually comprises transitioning between the different holograms by smoothing control signals delivered to a plurality of optically tunable EM scattering elements with piecewise-trigonometric functions.

In some embodiments, transitioning an antenna system between different holograms gradually comprises transitioning between the different holograms by smoothing control signals delivered to a plurality of optically tunable EM scattering elements with spline polynomial functions.

In some embodiments, controlling a plurality of optically tunable EM scattering elements comprises modulating a radiated wave over time to deliver a plurality of different frequency modulated information streams to a plurality of different far end locations.

In some embodiments, controlling a plurality of optically tunable EM scattering elements comprises modulating a radiated wave over time to deliver a plurality of different amplitude modulated information streams to a plurality of different far end locations.

In some embodiments, controlling a plurality of optically tunable EM scattering elements comprises modulating a radiated wave over time to deliver a plurality of different phase modulated information streams to a plurality of different far-end locations.

In some embodiments, controlling a plurality of optically tunable EM scattering elements comprises modulating a radiated wave over time to deliver a plurality of different quadrature amplitude modulated (QAM) data streams to a plurality of different far end locations.

In some embodiments, controlling a plurality of optically tunable EM scattering elements comprises modulating a radiated wave over time to deliver a plurality of different analog modulated information streams to a plurality of different far end locations.

In some embodiments, controlling a plurality of optically tunable EM scattering elements comprises modulating a radiated wave over time to deliver a plurality of different digital modulated data streams to a plurality of different far end locations.

In some embodiments, controlling a plurality of optically tunable EM scattering elements comprises modulating a radiated wave over time to deliver a plurality of different spread-spectrum modulated data streams to a plurality of different far end locations.

In some embodiments, propagating an electromagnetic (EM) signal as an EM reference wave comprises propagating the EM signal using a metamaterial comprising a waveguide and a plurality of optically tunable EM scattering elements.

In some embodiments, delivering a plurality of different information streams to a plurality of different far-end locations comprises delivering the plurality of different information streams to at least some of far-end locations coinciding with EM receivers.

In some embodiments, at least two of EM receivers include multiple input, multiple output (MIMO) devices.

In some embodiments, delivering a plurality of different information streams to at least some of far-end locations coinciding with EM receivers comprises delivering the plurality of different information streams to at least two groups of at least two EM receivers comprising MIMO receiver devices.

In some embodiments, delivering a plurality of different information streams to at least some of far-end locations coinciding with EM receivers comprises delivering the plurality of different information streams to at least two EM receivers belonging to two physically separate receiver devices.

In some embodiments, delivering a plurality of different information streams to at least some of far-end locations coinciding with EM receivers comprises delivering the plurality of different information streams to at least two groups of EM receivers, each having at least two receivers belonging to two physically separate receiver devices.

In some embodiments, controlling a plurality of tunable EM scattering elements with control lines includes controlling the tunable EM scattering elements using a plurality of acoustic transmission lines, and wherein the plurality of tunable EM scattering elements includes a plurality of acoustically tunable EM scattering elements tunable by acoustic signals transmitted through the plurality of acoustic transmission lines.

In some embodiments, controlling a plurality of acoustically tunable EM scattering elements comprises controlling a plurality of piezoelectric elements.

In some embodiments, controlling a plurality of acoustically tunable EM scattering elements comprises controlling magnetostrictive elements.

In some embodiments, controlling a plurality of acoustically tunable EM scattering elements comprises controlling microelectromechanical (MEM) elements.

In some embodiments, controlling a plurality of acoustically tunable EM scattering elements comprises modulating the plurality of acoustically tunable EM scattering elements at a frequency of at least about one (1) gigahertz.

In some embodiments, controlling a plurality of acoustically tunable EM scattering elements comprises modulating the plurality of acoustically tunable EM scattering elements at a time scale that is longer than a time that it takes for a radiated wave to travel from the plurality of acoustically tunable EM scattering elements to a plurality of different far-end locations.

In some embodiments, modulating a plurality of acoustically tunable EM scattering elements comprises modulating the plurality of acoustically tunable EM scattering elements as a temporal series of modulation patterns, wherein each modulation pattern of the series is determined by solving a time invariant holographic projection manifold function.

In some embodiments, solving a time invariant holographic projection manifold function comprises solving the time invariant holographic projection manifold functions using a Green's function.

In some embodiments, controlling a plurality of acoustically tunable EM scattering elements comprises modulating the plurality of acoustically tunable EM scattering elements at a time scale that is shorter than a time that it takes for a radiated wave to travel from the plurality of acoustically tunable EM scattering elements to a plurality of different far-end locations.

In some embodiments, modulating a plurality of acoustically tunable EM scattering elements comprises modulating the plurality of acoustically tunable EM scattering elements as a series of modulation patterns, wherein at least a portion of the modulation patterns of the series is determined by solving a time variant holographic projection manifold function.

In some embodiments, modulating a plurality of acoustically tunable EM scattering elements as a series of modulation patterns comprises solving a time variant holographic projection manifold function using a retarded Green's function.

In some embodiments, operating a plurality of tunable EM scattering elements in at least two different operational states comprises operating the plurality of tunable EM scattering elements in more than two operational states.

In some embodiments, transitioning an antenna system between different holograms gradually.

In some embodiments, transitioning an antenna system between different holograms gradually comprises transitioning between the different holograms by smoothing control signals delivered to a plurality of acoustically tunable EM scattering elements with smoothed Heaviside functions.

In some embodiments, transitioning an antenna system between different holograms gradually comprises transitioning between the different holograms by smoothing control signals delivered to a plurality of acoustically tunable EM scattering elements with piecewise-trigonometric functions.

In some embodiments, transitioning an antenna system between different holograms gradually comprises transitioning between the different holograms by smoothing control signals delivered to a plurality of acoustically tunable EM scattering elements with spline polynomial functions.

In some embodiments, controlling a plurality of acoustically tunable EM scattering elements comprises modulating a radiated wave over time to deliver a plurality of different frequency modulated information streams to a plurality of different far-end locations.

In some embodiments, controlling a plurality of acoustically tunable EM scattering elements comprises modulating a radiated wave over time to deliver a plurality of different amplitude modulated information streams to a plurality of different far-end locations.

In some embodiments, controlling a plurality of acoustically tunable EM scattering elements comprises modulating a radiated wave over time to deliver a plurality of different phase modulated information streams to a plurality of different far-end locations.

In some embodiments, controlling a plurality of acoustically tunable EM scattering elements comprises modulating a radiated wave over time to deliver a plurality of different quadrature amplitude modulated (QAM) data streams to a plurality of different far-end locations.

In some embodiments, controlling a plurality of acoustically tunable EM scattering elements comprises modulating a radiated wave over time to deliver a plurality of different analog modulated information streams to a plurality of different far-end locations.

In some embodiments, controlling a plurality of acoustically tunable EM scattering elements comprises modulating a radiated wave over time to deliver a plurality of different digital modulated data streams to a plurality of different far-end locations.

In some embodiments, controlling a plurality of acoustically tunable EM scattering elements comprises modulating a radiated wave over time to deliver a plurality of different spread-spectrum modulated data streams to a plurality of different far-end locations.

In some embodiments, propagating an electromagnetic (EM) signal as an EM reference wave comprises propagating the EM signal using a metamaterial comprising a waveguide and a plurality of acoustically tunable EM scattering elements.

In some embodiments, delivering a plurality of different information streams to a plurality of different far-end locations comprises delivering the plurality of different information streams to at least some of far-end locations coinciding with EM receivers.

In some embodiments, delivering a plurality of different information streams to at least some of far-end locations coinciding with EM receivers comprises delivering the plurality of different information streams to at least two of the EM receivers comprising multiple input, multiple output (MIMO) receiver devices.

In some embodiments, delivering a plurality of different information streams to at least some of far-end locations coinciding with EM receivers comprises delivering the plurality of different information streams to at least two groups of at least two EM receivers comprising MIMO receiver devices.

In some embodiments, delivering a plurality of different information streams to at least some of far-end locations coinciding with EM receivers comprises delivering the plurality of different information streams to at least two EM receivers belonging to two physically separate receiver devices.

In some embodiments, delivering a plurality of different information streams to at least some of far-end locations coinciding with EM receivers comprises delivering the plurality of different information streams to at least two groups of EM receivers, each having at least two receivers belonging to two physically separate receiver devices.

The disclosure relates to various applications of adaptive antenna arrays, in particular those based on Metamaterial Surface Scattering Technology (MSA-T). The disclosure also relates to other antenna systems, including, for example, power transmission antenna systems. Any other systems where transmission, receiving, or a combination thereof, of EM waves is made may benefit from teachings of the disclosure.

In antennas based on Metamaterial Surface Antenna Technology (MSA-T), coupling between a guided wave and propagating wave is achieved by modulating an impedance of a surface in electromagnetic contact with the guided wave. This controlled surface impedance is referred to as a "Modulation Pattern." The guided wave in the antenna is referred to as a "Reference Wave" or "Reference Mode," and a desired free space propagating wave pattern is referred to as a "Radiated Wave" or "Radiated Mode."

The general method for calculating the modulation pattern for MSA-T antennas is derived from holographic principles. In holography, the surface modulation function is a hologram ($\psi_{hol}$) formed by a beat of the reference wave ($E_{ref}$) and the desired radiated wave ($E_{rad}$). This relationship can be expressed compactly as:

$$\psi_{hol} = \frac{E_{ref}^* E_{rad}}{|E_{ref}|^2}. \qquad [1]$$

Equation [1] suggests that the optimal modulation function depends on the accuracy to which the radiated wave and reference wave are known.

MSA-T antennas include arrays of discrete radiating elements with element spacing less than one wavelength (e.g., less than one quarter wavelength) at the operating frequency. Radiation from each radiating element can be discretely modulated such that a collective effect approximates a desired modulation pattern.

As used herein, the term "metamaterials," include their bulk (volumetric, multi-layer, 3D) version, and a single-layer version (sometimes referred to as "metasurfaces"). Metamaterials can be used as electromagnetic holograms, both in the far field and a radiated near field. As used herein, the term "holographic projection," refers to a field distribution created in a selected plane, surface or volume by a remote field source and a remote hologram. A holographic projection can be viewed mathematically as a mapping between a source pattern and a field distribution observed in a select manifold (2D or 3D):

$$\{E_{hologram}(x_i)\} \to \{E_{observed}(x'_j)\}, \qquad [2]$$

where $x_i \in \Omega_{hologram}$ are selected points within the hologram manifold, and $x'_j \in \Omega_{observed}$ are selected points within the observation manifold. The bold face indicates three-dimensional vectors. This can also be written as a holographic projection functional:

$$E_{observed}(x') = P[E_{hologram}(x)] \qquad [3]$$

Some scientific literature adopts the notion that a hologram is of lower dimension than the manifold where the fields are created, leaving in reality only an option of projecting from a 2D surface into a 3D volume. In optics, however, it is widely accepted that holograms can be either thin (e.g., quasi-2D) or thick (e.g., volumetric), and the observation manifold can be either in the far-field (e.g., on a 2D sphere) or on the radiated near field (e.g., 3D). These latter, more general notions of holographic projections and holograms are adopted herein.

As used herein, the term "hologram" refers to a scattering and/or radiating medium, such as a metamaterial (including, by implication, a metasurface), which generates a holographic projection when properly excited with an intended field source. A hologram and a field source can be co-located or even intertwined, or they can be separated by a distance. Holograms based on tunable and/or active metamaterials can change as a function of time, based on a time-dependent actuation of the tunable elements and/or power sources embedded within such metamaterials. The same applies to adaptive antenna arrays, a class of radiating structures that overlaps architecturally and functionally with tunable/active metamaterials.

As used herein, the term "monochromatic" refers to a single EM frequency. For example, a "monochromatic signal" refers to an EM signal having a single frequency (e.g., a simple sinusoidal, continuous wave EM signal). By way of non-limiting example, a monochromatic continuous wave EM signal may include a radiofrequency signal (about 3 kilohertz (kHz) to about 300 megahertz (MHz)), a microwave signal (about 300 MHz to about 30 gigahertz (GHz)), a millimeter-wave signal (about 30 GHz to about 300 GHz), or other signal.

Adaptive antenna arrays, as well as tunable/active metamaterials, derive their response from two distinct sources: a feed(s) and control lines. Typically, the feed is either a waveguide or transmission line, or a network of transmission lines. The feed could also be a plane wave or another field distribution generated remotely, such as in dish and other reflector antennas (e.g., adaptive reflect-arrays). The feed delivers the majority or all of the power radiated by the adaptive antenna array. The control lines, on the contrary, typically do not deliver any substantial amount of power. Rather, the control lines are typically used to modulate the amount of power and the characteristics of electromagnetic radiation emitted from the antenna elements. The standard paradigm in adaptive antenna arrays, including phased arrays and MSA-T antennas, was to modulate the feed with frequencies contained in a selected radio frequency (RF) or microwave band, using the control lines only for beam pattern modulation on a relatively slow time scale. Under this approach, any and all receivers of signals from such an adaptive antenna array receive essentially the same information. While this is useful for broadcasting, this technique is incapable of creating multiple independent communication channels or information streams, which would be useful in a multi-user communications system (e.g., multi-user multiple input, multiple output (MU-MIMO)).

Disclosed herein are antenna systems and related methods that use time-dependence of control signals to generate time-dependent holographic projections, and that use those holographic projections to conduct wireless transmissions of information. In this way, a theoretical maximum throughput in a bandwidth-constrained and volume-constrained multi-user communication system may approach the theoretical maximum throughput in a bandwidth-constrained and volume-constrained multi-user communication system. In some embodiments, these antenna systems and methods provide a monochromatic or otherwise fixed-spectrum field to the tunable/adaptive radiating elements, and the control lines perform modulation to insert information into a wireless signals. In some embodiments, these antenna systems and methods can be combined with a time-dependent (modulated) feed.

FIG. 1 is a simplified block diagram of an antenna system 100 according to some embodiments. The antenna system 100 includes one or more feeds 110 configured to receive EM signals 102 (e.g., one or more EM signals 102) and propagate an EM reference wave 112 to a plurality of tunable EM scattering elements 120 of the antenna system 100. The plurality of tunable EM scattering elements 120 are spaced at sub-wavelength distances (e.g., at less than or equal to about a half wavelength of an operational frequency, at less than or equal to a quarter wavelength of the operational frequency, etc.). The plurality of tunable EM scattering elements 120 are configured to operate in at least two different operational states (e.g., binary and/or greyscale) to selectively scatter the EM reference wave as a radiated wave 122. As used herein, the term "operational frequency" refers to a fundamental frequency of the radiated wave in freespace (e.g., through the air).

The antenna system 100 also includes control circuitry 130 including a controller 132 operably coupled to the plurality of tunable EM scattering elements 120 by a plurality of control lines 134. The controller 132 is programmed to modulate the radiated wave 122 over time to deliver a plurality of different information streams to a plurality of different far-end locations 140 by modulating the plurality of tunable EM scattering elements 120 between the plurality of different operational states over time. In other words, an information stream from the radiated wave 122 received at some of the different far-end locations 140 may be different from an information stream from the radiated wave 122 received at others of the different far-end locations. As used herein, the term "information stream" refers to digital information streams (e.g., data streams), analog information streams, or combinations thereof.

In some embodiments, the EM signals 102 received by the feeds 110 are unmodulated, monochromatic signals. Accordingly, the modulation that occurs in the radiated wave 122 is responsive to the modulations performed on the tunable scattering elements 120 by the controller 132 through the control lines 134. In some embodiments, a combination of modulation on the EM signals 102 and the control lines 134 may be used.

In some embodiments, the antenna system 100 may include an MSA-T antenna system. MSA-T and other adaptive antenna array systems enable the generation of field distributions (i.e., holographic projections) with minimum deviation from a desired field profile, by virtue of selecting parameters of radiating elements (e.g., the tunable scattering elements 120) within their tenability range. Those parameters are controlled and enforced by control lines (e.g., the control lines 134). These techniques enable the creation of a desired field profile at any given time t:

$$E_{observed}(x',t')=P[E_{hologram}(x),t=t'-\Delta t], \quad [4]$$

where t is time at a near-end position where the feeds 110 and tunable scattering elements 120 are located, x is position relative to the near-end location, t' is time seen at one of the far-end locations 140, x' is position relative to the one of the far-end locations 140, $E_{observed}$ is an observed electric field at the one of the far-end locations 140, and $E_{hologram}$ is an electric field at the near-end location.

Because of finite propagation time, the time $t=t'+\Delta t$ in the left hand side (l.h.s.) of equation 4 is slightly later than the time t in the right hand side (r.h.s.) of equation 4. This difference in time is roughly the time of flight $\Delta t=d/c$, where d is the distance between the hologram and the projection manifold, and c is the speed of light along that path. This mapping can be calculated using a Green's function of electromagnetic fields. This function is particularly simple in the Fourier (plane-wave) representation.

In this fashion, an adaptive antenna array (e.g., the antenna system 100) used as a wireless transmitter can simultaneously carry out transmission of a number of different and independent information streams to a number of independent users (i.e., at different far-end locations 140). Since each user located at a different point $x'_j$ observes (receives) a different electric field, $E_{observed}(x'_j,t)$, the time dependence of this received electric field can be used to transmit information using any of variety of known modulation schemes. The number of users, each having an independent information stream, can be very large because the number is limited only by the number of tunable scattering elements 120 and/or the number of independent control lines 134 coupled to the tunable scattering elements 120. This scheme reduces (e.g., eliminates) inter-symbol or inter-channel interference issues, since all of these effects are taken into account as part of the time-dependent hologram calculation. Consequently, in a bandwidth-limited and volume-limited multi-user scenario, which is interference limited, the antenna system 100 enables communication to approach a highest theoretically possible sum-of-throughputs.

For equation [4] to be accurate without further complications it is assumed that the time of flight is much shorter than the typical modulation time scale for the hologram (or the symbol duration, in terms of wireless communications):

$$\Delta t << T_{sym}. \quad [5]$$

For example, for a communication distance of 1 kilometer (km) (a typical scale for macro-cellular communications), this condition of equation [5] limits the modulation rate to about 100,000 frames per second, or 100 kilohertz (kHz). For a communication distance of 10 meters (m) (a typical scale for indoor router usage scenarios), the above condition limits modulation rate to 10 MHz. In this low-modulation-frequency limit, time-dependent holograms can be generated as a series of frames, where the modulation pattern for each frame can be computed using the same algorithms that apply to quasi-static cases.

In addition, if hardware permits, the transition between the holograms can be continuous (e.g., greyscale as opposed to binary). By way of non-limiting example, transient signals in the control lines 134 can be based, at least in part, on smoothed Heaviside functions, piecewise-trigonometric functions, or spline polynomials.

For modulation rates exceeding the quasi-static hologram condition (equation [5]), the holographic projection equation becomes fully four-dimensional:

$$E_{observed}(x',t')=P[E_{hologram}(x,t<t')]. \quad [6]$$

Notation of equation [6] implies that the observed fields depend on the values of $E_{hologram}(x,t)$ at all previous times. Even so, the calculation of the modulation pattern for creating this time-dependent projection can be readily calculated using the standard retarded Green's function. The Liénard-Wiechert potentials are a convenient way to write the retarded Green's function in a way that reflects the physical notion of fields propagating at a constant speed c (about the speed of light) from their various sources to an observation point.

For the quasi-static case (equation [5]), methods for calculating an optimal control signal distribution for generating a desired hologram in an adaptive antenna array or MSA-T array (e.g., that of the antenna system 100 of FIG. 1) with non-negligible inter-element interaction generalize, in a straightforward fashion, to the time-dependent case. For faster-than-quasistatic modulation, these methods can be extended by including the time variable as an additional dimension. In other words, instead of N variable port impedances, the optimization algorithm must deal with $N \times N_{sym}$ port impedance values at times $t_i$, i=1, . . . $N_{sym}$.

It is implicitly assumed above that the control lines 134 are almost perfectly isolated from one another, as well as from the distributed feed (e.g., from all parts of the distributed feed). While isolation of the control lines 134 is relatively simple to achieve at frame rates in the kHz to a few MHz range, at a sufficiently high modulation frequency mutual coupling between the control lines 134 becomes an issue. These issues become relatively difficult to deal with at modulation rates in the GHz range or above, limiting the usability of conventional control line architectures to bandwidths of about 100 MHz. Consequently, data rates may cap out at roughly about 100 Mbit/s for mutually coupled control lines 134.

While systems with data rates at or below 100 Mbit/s are useful, there is demand for systems, such as the antenna system 100 of FIG. 1, that are cabable of operating in the Gbit/s data rate range. To accommodate such high hologram modulation rates, a different architecture of the control lines 134 is proposed herein. Instead of control lines being electromagnetic and based on RF transmission lines (e.g., electrical conductors or microstrip lines), control lines 134 configured for other types of fields are proposed herein.

In some embodiments, the control lines 134 operably coupling the controller 132 to the tunable scattering elements 120 are at least substantially electromagnetically isolated from each other. By way of non-limiting example, the control lines 134 may include optical control lines (e.g., fiber optics), acoustic control lines, or combinations thereof. Accordingly, the tunable scattering elements 120 may include optically tunable EM scattering elements, acoustically tunable EM scattering elements, other tunable EM scattering elements, or combinations thereof.

In embodiments where the control lines 134 include optical control lines, control fields carried by the control lines 134 may be optical. By way of non-limiting example, the control fields may include ultraviolet (UV) fields, visible light fields, infrared fields, far infrared fields, other optical fields, or combinations thereof. Generally speaking, optical fields may include electromagnetic fields with millimeter and shorter wavelengths. Such waves can be tightly confined in optical transmission lines (e.g., optical fibers), and modulated with RF frequencies. In such embodiments, the tunable EM scattering elements 120 may be actuated by optical fields. For example, the tunable EM scattering elements 120 may include photo-diodes, photo-transistors, other semiconductor-based elements affected by the photo-doping effect, or combinations thereof. By way of non-limiting example, the tunable EM scattering elements 120 may include gain media that can be optically pumped by the control lines in a time-dependent fashion. The tunable EM scattering elements 120 may include photo-sensitive media, which experience reversible transitions depending on the intensity of the optical fields delivered by the control lines 134.

In some embodiments, the control fields delivered by the control lines 134 are acoustic (e.g., elastodynamic, ultrasonic, phononic, etc.) vibrations, and the control lines 134 include acoustic waveguides. The tunable EM scattering elements 120 modulated by these fields may include piezoelectric elements, magnetostrictive elements, microelectromechanical (MEM) elements with electric field actuation, other tunable acoustic elements, or combinations thereof.

Figure 2:
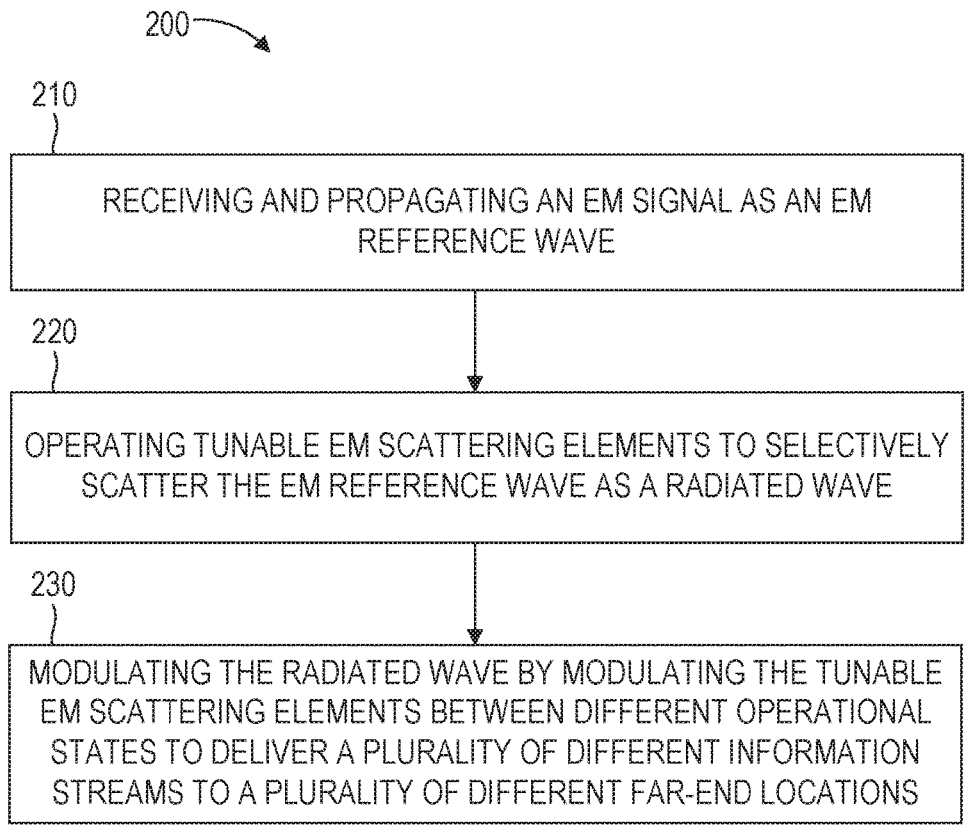
FIG. 2 is a simplified flowchart illustrating a method of operating the antenna system of FIG. 1.

FIG. 2 is a simplified flowchart illustrating a method 200 of operating an antenna system (e.g., the antenna system 100 of FIG. 1). Referring to FIGS. 1 and 2 together, the method 200 includes receiving and propagating 210 an EM signal 102 as an EM reference wave 112. In some embodiments, receiving and propagating 210 the EM signal 102 as an EM reference wave 112 includes receiving the EM signal 102 through an EM transmission line, and propagating the EM reference wave 112 on or in a body including tunable EM scattering elements 120.

The method 200 also includes operating 220 the tunable EM scattering elements 120 to selectively scatter the EM reference wave 112 as a radiated wave 122. In some embodiments, operating 220 the tunable EM scattering elements 120 includes applying controls to the tunable scattering elements 120 through control lines 134 that are decoupled from each other. By way of non-limiting example, applying controls through control lines 134 that are decoupled from each other may include applying optical signals through the control lines 134. Also by way of non-limiting example, applying controls through control lines 134 that are decoupled from each other may include applying acoustic signals through the control lines 134.

The method 200 further includes modulating 230 the radiated wave 122 by modulating the tunable EM scattering elements 120 between different operational states to deliver a plurality of different information streams to a plurality of different far-end locations 140.

In some embodiments, receiving 210 an EM signal 102 includes receiving a monochromatic sinusoidal signal. Since modulating 230 of the EM radiated wave 122 is performed by the modulating the tunable EM scattering elements 120, even a monochromatic sinusoidal signal fed to the feeds 110 of the antenna system 100 can be used to create a plurality (e.g., a very large number) of different information streams at the plurality of different far-end locations 140. In some embodiments, however, some modulation of the EM signals 102 may be used to create some modulation in the radiated wave 122 in addition to the modulation that results from modulating 230 the radiated wave 122 by modulating the tunable EM scattering elements 120.

Receivers at the far-end locations 140 may receive the separate information streams, which may each be delivered simultaneously using the same EM frequencies. In this way, a large number of different information streams can be transmitted using a single EM signal 102, or using a few EM signals 102, being fed to the feeds 110. This is in contrast to separately modulated signals being fed for each of the far-end receivers. Also, separate multiplexing systems (e.g., code division multiplexing, frequency division multiplexing, time division multiplexing, space division multiplexing, etc.) for each far-end location 140 may be avoided.

Figure 3:
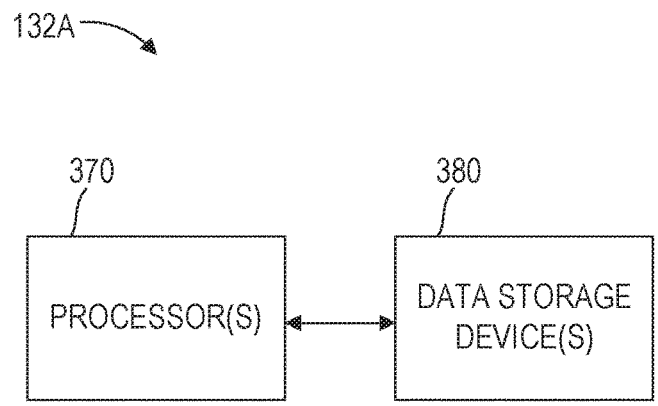
FIG. 3 is a simplified block diagram of a controller of the antenna system of FIG. 1.

FIG. 3 is a simplified block diagram of a controller 132A that may be used as the controller 132 of the antenna system 100 of FIG. 1. The controller 132A includes at least one processor 370 (sometimes referred to herein simply as "processor" 270) operably coupled to at least one data storage device 380 (sometimes referred to herein simply as "storage" 380). The storage 380 includes computer-readable instructions stored thereon. The computer-readable instructions are configured to instruct the processor 370 to perform operations that the controller 132A is configured to perform. By way of non-limiting example, the computer-readable instructions may be configure to instruct the processor 370 to perform at least a portion of the operations of the method 200 of FIG. 2.

In some embodiments, the storage 380 includes a volatile data storage device, a non-volatile data storage device, or combinations thereof. By way of non-limiting example, the storage 380 may include a Flash drive, a hard drive, a solid state drive, a memory card and or/card reader, an optical drive and/or optical disk, a thumb drive, electrically programmable read only memory (EEPROM), other data storage devices, or combinations thereof.

The processor 370 includes any device capable of executing the computer-readable instructions stored by the storage 380. By way of non-limiting example, the processor 370 may include a central processing unit (CPU), a microcontroller, a programmable logic controller (PLC), other programmable processor, or combinations thereof.

It should be understood that the controller 132 of FIG. 1 may include other devices instead of, or in addition to, the controller 132A of FIG. 3. By way of non-limiting example, the controller 132 may include a field programmable gate array (FPGA), an application specific integrated circuit (ASIC), a system on chip (SOC), other hardware elements, or combinations thereof that are configured to perform at least a portion of the functions the controller 132 is configured to perform (e.g., the functions of the method 200 of FIG. 2).

In some embodiments, the control circuitry 130 may include a wireless controller configured to wirelessly control the tunable scattering elements 120. As previously discussed, various features disclosed herein may be applied alone or in combination with others of the features disclosed herein. These features are too numerous to explicitly indicate herein each and every other one of the features that may be combined therewith. Therefore, any feature disclosed herein that is practicable, in the view of one of ordinary skill, to combine with any other one or more others of the features disclosed herein, is contemplated herein to be combined. Another non-exhaustive list of some of these disclosed features that may be combined with others of the disclosed features follows.

In some embodiments, an antenna system comprises one or more feeds configured to receive an electromagnetic (EM) signal and propagate the EM signal as an EM reference wave. The antenna system also comprises a plurality of tunable EM scattering elements spaced at sub-wavelength distances. Each of the plurality of tunable EM scattering elements is configured to operate in at least two different operational states to selectively scatter the EM reference wave as a radiated wave. The antenna system further comprises a wireless controller configured to wirelessly control the plurality of tunable EM scattering elements and modulate the radiated wave over time to deliver a plurality of different information streams to a plurality of different far-end locations by modulating the plurality of tunable EM scattering elements between the plurality of different operational states over time.

In some embodiments, an antenna system includes a feed configured to receive an EM signal, wherein the EM signal is a monochromatic continuous wave EM signal.

In some embodiments, an antenna system includes a feed configured to receive a monochromatic continuous wave EM signal wherein the monochromatic continuous wave EM signal is a radiofrequency signal.

In some embodiments, an antenna system includes a feed configured to receive a monochromatic continuous wave EM signal, wherein the monochromatic continuous wave EM signal is a microwave signal.

In some embodiments, an antenna system includes a feed configured to receive a monochromatic continuous wave EM signal, wherein the monochromatic continuous wave EM signal is a millimeter-wave signal.

In some embodiments, an antenna system includes a feed configured to receive an EM signal, wherein the EM signal is a modulated EM signal.

In some embodiments, an antenna system includes a wireless controller configured to control each of a plurality of tunable EM scattering elements separately.

In some embodiments, an antenna system includes plurality of tunable EM scattering elements configured to operate in at least two different operational states, wherein the two or more different operational states comprises more than two operational states.

In some embodiments, an antenna system includes a wireless controller configured to transition the antenna system between different holograms gradually.

In some embodiments, an antenna system comprises a plurality of EM filters corresponding to a plurality of tunable EM scattering elements. The wireless controller includes an EM emitter configured to emit EM radiation encompassing a wide frequency range. Each of the plurality of EM filters is configured to pass only a portion of the EM radiation encompassing the wide frequency range. The plurality of tunable EM scattering elements is configured to switch between at least two different operational states responsive to receiving the portion of the EM radiation passed by the corresponding ones of the plurality of EM filters. The wireless controller is configured to vary frequency content of the EM radiation to control the plurality of tunable EM scattering elements to deliver a plurality of different information streams to a plurality of different far-end locations.

In some embodiments, an antenna system includes a plurality of EM filters, wherein a portion of EM radiation passed by each of the plurality of EM filters is orthogonal to each other portion of the EM radiation passed by others of the plurality of EM filters.

In some embodiments, an antenna system includes a plurality of EM filters, wherein a portion of EM radiation passed by each of the plurality of EM filters comprises a continuous frequency segment of the wide frequency range.

In some embodiments, an antenna system includes a plurality of EM filters, wherein a portion of EM radiation passed by each of the plurality of EM filters comprises an orthogonal frequency division multiplexing (OFDM) defined portion of the EM radiation.

In some embodiments, an antenna system includes a plurality of EM filters, wherein a portion of EM radiation passed by each of the plurality of EM filters comprises a code division multiplexing (CDM) defined portion of the EM radiation.

In some embodiments, an antenna system includes an EM emitter configured to emit EM radiation encompassing a wide frequency range, wherein a lowest frequency in the wide frequency range is at least about twice a frequency of a reference wave.

In some embodiments, an antenna system includes an EM emitter configured to emit EM radiation encompassing a wide frequency range, wherein a lowest frequency in the wide frequency range is at least about one terahertz (1 THz).

In some embodiments, an antenna system includes an EM emitter configured to emit EM radiation encompassing a wide frequency range, wherein a lowest frequency in the wide frequency range is at least about one hundred terahertz (100 THz).

In some embodiments, an antenna system includes a plurality of tunable EM scattering elements, wherein the plurality of tunable EM scattering elements includes a plurality of optically tunable EM scattering elements tunable by portions of EM radiation passed by corresponding ones of the plurality of EM filters.

In some embodiments, an antenna system includes a plurality of optically tunable EM scattering elements comprising a plurality of photodiodes.

In some embodiments, an antenna system includes a plurality of optically tunable EM scattering elements comprising a plurality of phototransistors.

In some embodiments, an antenna system includes a plurality of optically tunable EM scattering elements comprising a plurality of photoconductive or photoresistive elements.

In some embodiments, an antenna system includes a plurality of optically tunable EM scattering elements comprising a plurality of phase-change elements configured to reversibly change phase responsive to heat deposition of optical radiation.

In some embodiments, an antenna system includes a wireless controller configured to modulate a plurality of optically tunable EM scattering elements at a frequency of at least about one (1) gigahertz.

In some embodiments, an antenna system includes a wireless controller configured to modulate a plurality of optically tunable EM scattering elements at a time scale that is longer than a time that it takes for a radiated wave to travel from the plurality of optically tunable EM scattering elements to a plurality of different far-end locations.

In some embodiments, an antenna system includes a wireless controller configured to modulate a plurality of optically tunable EM scattering elements as a temporal series of modulation patterns, wherein each modulation pattern of the series is determined by solving a time invariant holographic projection manifold function.

In some embodiments, an antenna system includes a wireless controller configured to solve a time invariant holographic projection manifold function using a Green's function.

In some embodiments, an antenna system includes a wireless controller configured to modulate a plurality of optically tunable EM scattering elements at a time scale that is shorter than a time that it takes for a radiated wave to travel from the plurality of optically tunable EM scattering elements to a plurality of different far-end locations.

In some embodiments, an antenna system includes a wireless controller configured to modulate a plurality of optically tunable EM scattering elements as a temporal series of modulation patterns, wherein at least a portion of the modulation patterns of the temporal series is determined by solving a time variant holographic projection manifold function.

In some embodiments, an antenna system includes a wireless controller configured to solve a time variant holographic projection manifold function using a retarded Green's function.

In some embodiments, an antenna system includes a wireless controller configured to modulate a radiated wave over time to deliver a plurality of different frequency modulated information streams to a plurality of different far-end locations.

In some embodiments, an antenna system includes a wireless controller configured to modulate a radiated wave over time to deliver a plurality of different amplitude modulated information streams to a plurality of different far-end locations.

In some embodiments, an antenna system includes a wireless controller configured to modulate a radiated wave over time to deliver a plurality of different phase modulated information streams to a plurality of different far-end locations.

In some embodiments, an antenna system includes a wireless controller configured to modulate a radiated wave over time to deliver a plurality of different quadrature amplitude modulated (QAM) data streams to a plurality of different far-end locations.

In some embodiments, an antenna system includes a wireless controller configured to modulate a radiated wave over time to deliver a plurality of different analog modulated information streams to a plurality of different far-end locations In some embodiments, an antenna system includes a wireless controller configured to modulate a radiated wave over time to deliver a plurality of different digital modulated data streams to a plurality of different far-end locations.

In some embodiments, an antenna system includes a wireless controller configured to modulate a radiated wave over time to deliver a plurality of different spread-spectrum modulated data streams to a plurality of different far-end locations.

In some embodiments, an antenna system includes a plurality of tunable EM scattering elements comprising a metamaterial or a metasurface.

In some embodiments, an antenna system includes a plurality of tunable EM scattering elements and a waveguide carrying the plurality of tunable EM scattering elements, the plurality of tunable EM scattering elements and the waveguide comprising a metamaterial or a metasurface.

In some embodiments, an antenna system includes a wireless controller configured to deliver a plurality of different information streams to a plurality of different far-end locations, wherein at least some of the far-end locations coincide with EM receivers.

In some embodiments, an antenna system includes a wireless controller configured to deliver a plurality of different information streams to a plurality of different far-end locations, wherein at least two EM receivers comprise multiple input, multiple output (MIMO) receiver devices.

In some embodiments, an antenna system includes a wireless controller configured to deliver a plurality of different information streams to a plurality of different far-end locations, wherein at least two groups of at least two EM receivers comprise MIMO receiver devices.

In some embodiments, an antenna system includes a wireless controller configured to deliver a plurality of different information streams to a plurality of different far-end locations, wherein at least two EM receivers belong to two physically separate receiver devices.

In some embodiments, an antenna system includes a wireless controller configured to deliver a plurality of different information streams to a plurality of different far-end locations, wherein at least two groups of EM receivers each having at least two receivers belong to two physically separate receiver devices.

In some embodiments, a wireless antenna controller includes an electromagnetic (EM) emitter configured to controllably emit EM radiation of a frequency range to a plurality of tunable EM scattering elements through a plurality of EM filters. The plurality of EM filters are configured to pass different sub-ranges of the frequency range to different ones of the plurality of tunable EM scattering elements. The plurality of tunable EM scattering elements is configured to operate in a plurality of different scattering states responsive to the sub-ranges of the frequency range. The wireless antenna controller also includes control circuitry operably coupled to the EM emitter. The control circuitry includes at least one data storage device including computer-readable instructions stored thereon. The control circuitry also includes and at least one processor operably coupled to the at least one data storage device, the processor configured to execute the computer-readable instructions. The computer-readable instructions are configured to instruct the at least one processor to control the EM emitter to modulate frequency content of the EM radiation to cause the plurality of tunable EM scattering elements to operate collectively according to a plurality of different modulation patterns.

In some embodiments, a wireless antenna controller is programmed with computer-readable instructions, wherein the computer readable instructions are configured to instruct at least one processor to control an EM emitter to modulate frequency content of EM radiation over time to vary modulation patterns of a plurality of tunable EM scattering elements over time such that the plurality of tunable EM scattering elements scatter an EM reference wave to produce a radiated wave that carries a plurality of different information streams to a plurality of different far-end locations.

In some embodiments, a wireless antenna controller includes a feed, wherein an EM reference wave is fed to a plurality of tunable EM scattering elements through the feed responsive to a monochromatic continuous wave EM signal at the feed.

In some embodiments, a wireless antenna controller includes a feed, wherein an EM reference wave is fed to a plurality of tunable EM scattering elements through the feed responsive to a monochromatic continuous wave EM signal at the feed, and wherein the monochromatic continuous wave EM signal is a radiofrequency signal.

In some embodiments, a wireless antenna controller includes a feed, wherein an EM reference wave is fed to a plurality of tunable EM scattering elements through the feed responsive to a monochromatic continuous wave EM signal at the feed, and wherein the monochromatic continuous wave EM signal is a microwave signal.

In some embodiments, a wireless antenna controller includes a feed, wherein an EM reference wave is fed to a plurality of tunable EM scattering elements through the feed responsive to a monochromatic continuous wave EM signal at the feed, and wherein the monochromatic continuous wave EM signal is a millimeter-wave signal.

In some embodiments, a wireless antenna controller includes a feed, wherein an EM reference wave is fed to a plurality of tunable EM scattering elements through a feed responsive to a modulated EM signal at the feed.

In some embodiments, a wireless antenna controller is programmed with computer-readable instructions, wherein the computer readable instructions are configured to instruct at least one processor to control an EM emitter to modulate frequency content of EM radiation to modulate a plurality of tunable EM scattering elements at a time scale that is longer than a time that it takes for a radiated wave to travel from the plurality of tunable EM scattering elements to a plurality of different far-end locations.

In some embodiments, a wireless antenna controller is programmed with computer-readable instructions, wherein the computer readable instructions are configured to instruct at least one processor to control an EM emitter to modulate a plurality of tunable EM scattering elements at a time scale that is shorter than a time that it takes for a radiated wave to travel from the plurality of tunable EM scattering elements to a plurality of different far-end locations.

In some embodiments, the computer readable instructions are configured to instruct the at least one processor to control the EM emitter to modulate the plurality of tunable EM scattering elements as a temporal series of modulation patterns, wherein at least a portion of the modulation patterns of the temporal series is determined by solving a time variant holographic projection manifold function.

In some embodiments, a wireless antenna controller is programmed with computer-readable instructions, wherein the computer readable instructions are configured to instruct at least one processor to solve a time variant holographic projection manifold function using a retarded Green's function.

In some embodiments, a wireless antenna controller is programmed with computer-readable instructions, wherein the computer readable instructions are configured to instruct at least one processor to control an EM emitter to modulate a radiated wave over time to deliver a plurality of different frequency modulated information streams to a plurality of different far-end locations.

In some embodiments, a wireless antenna controller is programmed with computer-readable instructions, wherein the computer readable instructions are configured to instruct at least one processor to control an EM emitter to modulate a radiated wave over time to deliver a plurality of different amplitude modulated information streams to a plurality of different far-end locations.

In some embodiments, a wireless antenna controller is programmed with computer-readable instructions, wherein the computer readable instructions are configured to instruct at least one processor to control an EM emitter to modulate a radiated wave over time to deliver a plurality of different phase modulated information streams to a plurality of different far-end locations.

In some embodiments, a wireless antenna controller is programmed with computer-readable instructions, wherein the computer readable instructions are configured to instruct at least one processor to control an EM emitter to modulate a radiated wave over time to deliver a plurality of different quadrature amplitude modulated (QAM) data streams to a plurality of different far-end locations.

In some embodiments, a wireless antenna controller is programmed with computer-readable instructions, wherein the computer readable instructions are configured to instruct at least one processor to control an EM emitter to modulate a radiated wave over time to deliver a plurality of different analog modulated information streams to a plurality of different far-end locations.

In some embodiments, a wireless antenna controller is programmed with computer-readable instructions, wherein the computer readable instructions are configured to instruct at least one processor to control an EM emitter to modulate a radiated wave over time to deliver a plurality of different digital modulated data streams to a plurality of different far-end locations.

In some embodiments, a wireless antenna controller is programmed with computer-readable instructions, wherein the computer readable instructions are configured to instruct at least one processor to control an EM emitter to modulate a radiated wave over time to deliver a plurality of different spread spectrum modulated data streams to a plurality of different far-end locations.

In some embodiments, a wireless antenna controller is programmed with computer-readable instructions, wherein the computer readable instructions are configured to instruct at least one processor to control an EM emitter to modulate frequency content of EM radiation over time to vary modulation patterns of a plurality of tunable EM scattering elements over time such that the plurality of tunable EM scattering elements scatter an EM reference wave to produce a radiated wave that carries a plurality of different information streams to a plurality of different far-end locations, wherein at least some of the plurality of different far-end locations coincide with EM receivers.

In some embodiments, a wireless antenna controller is programmed with computer-readable instructions, wherein the computer readable instructions are configured to instruct at least one processor to control an EM emitter to modulate frequency content of EM radiation over time to vary modulation patterns of a plurality of tunable EM scattering elements over time such that the plurality of tunable EM scattering elements scatter an EM reference wave to produce a radiated wave that carries a plurality of different information streams to a plurality of different far-end locations, wherein at least two of the EM receivers comprise multiple input, multiple output (MIMO) receiver devices.

In some embodiments, a wireless antenna controller is programmed with computer-readable instructions, wherein the computer readable instructions are configured to instruct at least one processor to control an EM emitter to modulate frequency content of EM radiation over time to vary modulation patterns of a plurality of tunable EM scattering elements over time such that the plurality of tunable EM scattering elements scatter an EM reference wave to produce a radiated wave that carries a plurality of different information streams to a plurality of different far-end locations, wherein at least two groups of at least two of the EM receivers comprise MIMO receiver devices.

In some embodiments, a wireless antenna controller is programmed with computer-readable instructions, wherein the computer readable instructions are configured to instruct at least one processor to control an EM emitter to modulate frequency content of EM radiation over time to vary modulation patterns of a plurality of tunable EM scattering elements over time such that the plurality of tunable EM scattering elements scatter an EM reference wave to produce a radiated wave that carries a plurality of different information streams to a plurality of different far-end locations, wherein at least two of the EM receivers belong to two physically separate receiver devices.

In some embodiments, a wireless antenna controller is programmed with computer-readable instructions, wherein the computer readable instructions are configured to instruct at least one processor to control an EM emitter to modulate frequency content of EM radiation over time to vary modulation patterns of a plurality of tunable EM scattering elements over time such that the plurality of tunable EM scattering elements scatter an EM reference wave to produce a radiated wave that carries a plurality of different information streams to a plurality of different far-end locations, wherein at least two groups of the EM receivers each having at least two receivers belong to two physically separate receiver devices.

In some embodiments, a wireless antenna controller includes an EM emitter and control circuitry configured to control each of the plurality of tunable EM scattering elements separately.

In some embodiments, a wireless antenna controller includes a plurality of tunable EM scattering elements, wherein a plurality of different scattering states of the plurality of tunable EM scattering elements comprises more than two different scattering states.

In some embodiments, a wireless antenna controller an EM emitter and control circuitry are configured to transition an antenna system between different holograms gradually.

In some embodiments, a wireless antenna controller includes a plurality of EM filters, wherein a sub-range of EM radiation passed by each of the plurality of EM filters is orthogonal to other sub-ranges of the EM radiation passed by others of the plurality of EM filters.

In some embodiments, a sub-range of the EM radiation passed by each of the plurality of EM filters comprises a continuous frequency segment of the frequency range.

In some embodiments, a wireless antenna controller includes a plurality of EM filters, wherein different sub-ranges of EM radiation passed by each of the plurality of EM filters comprise orthogonal frequency division multiplexing (OFDM) defined sub-ranges of the EM radiation.

In some embodiments, a wireless antenna controller includes a plurality of EM filters, wherein different sub-ranges of EM radiation passed by each of the plurality of EM filters comprise code division multiplexing (CDM) defined sub-ranges of the EM radiation.

In some embodiments, a wireless antenna controller includes an EM emitter configured to controllably emit EM radiation of a frequency range, wherein a lowest frequency in the frequency range is at least about twice a frequency of a reference wave a plurality of tunable EM scattering elements is configured to scatter to form a radiated wave.

In some embodiments, a wireless antenna controller includes an EM emitter configured to controllably emit EM radiation of a frequency range, wherein a lowest frequency in the frequency range is at least about one terahertz (1 THz).

In some embodiments, a wireless antenna controller includes an EM emitter configured to controllably emit EM radiation of a frequency range, wherein a lowest frequency in the frequency range is at least about one hundred terahertz (100 THz).

In some embodiments, a wireless antenna controller includes a plurality of tunable EM scattering elements including a plurality of optically tunable EM scattering elements tunable by sub-ranges of EM radiation passed by corresponding ones of a plurality of EM filters.

In some embodiments, a wireless antenna controller includes a plurality of optically tunable EM scattering elements comprising a plurality of photodiodes.

In some embodiments, a wireless antenna controller includes a plurality of optically tunable EM scattering elements comprising a plurality of phototransistors.

In some embodiments, a wireless antenna controller includes a plurality of optically tunable EM scattering elements comprising a plurality of photoconductive or photoresistive elements.

In some embodiments, a wireless antenna controller includes a plurality of optically tunable EM scattering elements comprising a plurality of phase-change elements configured to reversibly change phase responsive to heat deposition of optical radiation.

In some embodiments, a wireless antenna controller is programmed with computer-readable instructions, wherein the computer readable instructions are configured to instruct at least one processor to control an EM emitter to modulate frequency content of EM radiation to modulate a plurality of tunable EM scattering elements at a frequency of at least about one gigahertz (1 GHz).

In some embodiments, a wireless antenna controller of is programmed with computer-readable instructions, wherein the computer readable instructions are configured to instruct the at least one processor to control an EM emitter to modulate a plurality of tunable EM scattering elements as a temporal series of modulation patterns, wherein each modulation pattern of the series is determined by solving a time invariant holographic projection manifold function.

In some embodiments, a wireless antenna controller is programmed with computer-readable instructions, wherein the computer readable instructions are configured to instruct at least one processor to solve a time invariant holographic projection manifold functions using a Green's function.

In some embodiments, a wireless antenna controller includes a plurality of optically tunable EM scattering elements, wherein the plurality of optically tunable EM scattering elements comprises a metamaterial or a metasurface.

In some embodiments, a wireless antenna controller of includes a plurality of tunable EM scattering elements, wherein the plurality of tunable EM scattering elements and a waveguide carrying the plurality of tunable EM scattering elements comprise a metamaterial or a metasurface.

In some embodiments, a method of operating an antenna system includes applying an electromagnetic (EM) signal to one or more feeds configured to receive and propagate the EM signal as an EM reference wave. The method also includes scattering the EM reference wave as a radiated wave with a plurality of tunable EM scattering elements spaced at sub-wavelength distances. The plurality of tunable EM scattering elements is configured to operate in at least two different operational states. The method further includes wirelessly controlling the plurality of tunable EM scattering elements with a wireless controller to modulate the radiated wave over time to deliver a plurality of different information streams to a plurality of different far-end locations by modulating the plurality of tunable EM scattering elements between the plurality of different operational states over time.

In some embodiments, a method includes applying an EM signal to one or more feeds, which comprises applying a monochromatic continuous wave EM signal.

In some embodiments, a method includes applying an EM signal to one or more feeds, which comprises applying a modulated EM signal.

In some embodiments, a method includes wirelessly controlling a plurality of tunable EM scattering elements with a wireless controller, which comprises controlling each of the plurality of tunable EM scattering elements separately.

In some embodiments, a method includes scattering an EM reference wave as a radiated wave with a plurality of tunable EM scattering elements configured to operate in two or more different operational states, which comprises operating each of the plurality of tunable EM scattering elements in more than two operational states.

In some embodiments, a method includes scattering an EM reference wave as a radiated wave with a plurality of tunable EM scattering elements configured to operate in two or more different operational states, which comprises transitioning the antenna system between different holograms gradually.

In some embodiments, a method includes wirelessly controlling a plurality of tunable EM scattering elements, which includes: emitting EM radiation encompassing a wide frequency range with an EM emitter of the wireless controller; passing only a portion of the EM radiation encompassing the wide frequency range with each of a plurality of EM filters corresponding to the plurality of tunable EM scattering elements; switching the plurality of tunable EM scattering elements between the at least two different operational states responsive to receiving the portion of the EM radiation passed by the corresponding ones of the plurality of EM filters; and varying frequency content of the EM radiation to control the plurality of tunable EM scattering elements to deliver a plurality of different information streams to a plurality of different far-end locations.

In some embodiments, a method includes passing only a portion of EM radiation encompassing a wide frequency range, which comprises passing, with each of the plurality of EM filters, only a portion of the EM radiation that is orthogonal to each other portion of the EM radiation passed by others of the plurality of EM filters.

In some embodiments, a method includes passing only a portion of EM radiation encompassing wide frequency range, which comprises passing, with each of a plurality of EM filters, a continuous frequency segment of the wide frequency range.

In some embodiments, a method includes passing only a portion of EM radiation encompassing a wide frequency range, which comprises passing, with each of the plurality of EM filters, an orthogonal frequency division multiplexing (OFDM) defined portion of the EM radiation.

In some embodiments, a method includes passing only a portion of the EM radiation encompassing a wide frequency range, which comprises passing, with each of the plurality of EM filters, a code division multiplexing (CDM) defined portion of the EM radiation.

In some embodiments, a method includes emitting EM radiation encompassing a wide frequency range, which comprises emitting the EM radiation with the wide frequency range having a lowest frequency that is at least about twice a frequency of a reference wave.

In some embodiments, a method includes emitting EM radiation encompassing a wide frequency range, which comprises emitting the EM radiation with the wide frequency range having a lowest frequency that is at least about one terahertz (1 THz).

In some embodiments, a method includes emitting EM radiation encompassing a wide frequency range, which comprises emitting the EM radiation with the wide frequency range having a lowest frequency that is at least about one hundred terahertz (100 THz).

In some embodiments, a method includes wirelessly controlling a plurality of tunable EM scattering elements, which comprises optically controlling the plurality of optically tunable EM scattering elements tunable by portions of EM radiation passed by corresponding ones of a plurality of EM filters.

In some embodiments, a method includes optically controlling a plurality of optically tunable EM scattering elements, which comprises optically controlling a plurality of photodiodes.

In some embodiments, a method includes optically controlling a plurality of optically tunable EM scattering elements, which comprises optically controlling a plurality of phototransistors.

In some embodiments, a method includes optically controlling a plurality of optically tunable EM scattering elements, which comprises optically controlling a plurality of photoconductive or photoresistive elements.

In some embodiments, a method includes optically controlling a plurality of optically tunable EM scattering elements, which comprises optically controlling a plurality of phase-change elements configured to reversibly change phase responsive to heat deposition of optical radiation.

In some embodiments, a method includes optically controlling a plurality of optically tunable EM scattering elements, which comprises modulating the plurality of optically tunable EM scattering elements at a frequency of at least about one (1) gigahertz.

In some embodiments, a method includes optically controlling a plurality of optically tunable EM scattering elements, which comprises modulating the plurality of optically tunable EM scattering elements at a time scale that is longer than a time that it takes for a radiated wave to travel from the plurality of optically tunable EM scattering elements to a plurality of different far-end locations.

In some embodiments, a method includes optically controlling a plurality of optically tunable EM scattering elements, which comprises modulating the plurality of optically tunable EM scattering elements as a temporal series of modulation patterns, wherein each modulation pattern of the series is determined by solving a time invariant holographic projection manifold function.

In some embodiments, a method includes solving a time invariant holographic projection manifold function, which comprises solving the time invariant holographic projection manifold function using a Green's function.

In some embodiments, a method includes optically controlling a plurality of optically tunable EM scattering elements, which comprises modulating the plurality of optically tunable EM scattering elements at a time scale that is shorter than a time that it takes for a radiated wave to travel from the plurality of optically tunable EM scattering elements to a plurality of different far-end locations.

In some embodiments, a method includes optically controlling a plurality of optically tunable EM scattering elements, which comprises modulating the plurality of optically tunable EM scattering elements as a temporal series of modulation patterns, wherein at least a portion of the modulation patterns of the temporal series is determined by solving a time variant holographic projection manifold function.

In some embodiments, a method includes solving a time variant holographic projection manifold function, which comprises solving the time variant holographic projection manifold function using a retarded Green's function.

In some embodiments, a method includes wirelessly controlling a plurality of tunable EM scattering elements, which comprises modulating the radiated wave over time to deliver a plurality of different frequency modulated information streams to the plurality of different far-end locations.

In some embodiments, a method includes wirelessly controlling a plurality of tunable EM scattering elements, which comprises modulating a radiated wave over time to deliver a plurality of different amplitude modulated information streams to a plurality of different far-end locations.

In some embodiments, a method includes wirelessly controlling a plurality of tunable EM scattering elements, which comprises modulating a radiated wave over time to deliver a plurality of different phase modulated information streams to a plurality of different far-end locations.

In some embodiments, a method includes wirelessly controlling a plurality of tunable EM scattering elements, which comprises modulating a radiated wave over time to deliver a plurality of different quadrature amplitude modulated (QAM) data streams to a plurality of different far-end locations.

In some embodiments, a method includes wirelessly controlling a plurality of tunable EM scattering elements, which comprises modulating the radiated wave over time to deliver a plurality of different analog modulated information streams to the plurality of different far-end locations In some embodiments, a method includes wirelessly controlling a plurality of tunable EM scattering elements, which comprises modulating a radiated wave over time to deliver a plurality of different digital modulated data streams to a plurality of different far-end locations.

In some embodiments, a method includes wirelessly controlling the plurality of tunable EM scattering elements, which comprises modulating a radiated wave over time to deliver a plurality of different spread-spectrum modulated data streams to a plurality of different far-end locations.

In some embodiments, a method includes wirelessly controlling a plurality of tunable EM scattering elements, which comprises wirelessly controlling a metamaterial or a metasurface.

In some embodiments, a method includes operating a waveguide carrying a plurality of tunable EM scattering elements and the plurality of optically tunable EM scattering elements, wherein operating the waveguide and the plurality of tunable EM scattering elements comprises operating a metamaterial or a metasurface.

In some embodiments, a method includes wirelessly controlling a plurality of tunable EM scattering elements to deliver a plurality of different information streams to a plurality of different far-end locations, which comprises controlling the plurality of tunable EM scattering elements to deliver the plurality of different information streams to at least some of the far-end locations coinciding with EM receivers.

In some embodiments, a method includes wirelessly controlling a plurality of tunable EM scattering elements to deliver a plurality of different information streams to a plurality of different far-end locations, which comprises controlling the plurality of tunable EM scattering elements to deliver the plurality of different information streams to at least two EM receivers comprising multiple input, multiple output (MIMO) receiver devices.

In some embodiments, a method includes wirelessly controlling a plurality of tunable EM scattering elements to deliver a plurality of different information streams to a plurality of different far-end locations, which comprises controlling the plurality of tunable EM scattering elements to deliver the plurality of different information streams to at least two groups of at least two EM receivers comprising MIMO receiver devices.

In some embodiments, a method includes wirelessly controlling a plurality of tunable EM scattering elements to deliver a plurality of different information streams to a plurality of different far-end locations, which comprises controlling the plurality of tunable EM scattering elements to deliver the plurality of different information streams to at least two EM receivers belonging to two physically separate receiver devices.

In some embodiments, a method includes wirelessly controlling a plurality of tunable EM scattering elements to deliver a plurality of different information streams to a plurality of different far-end locations, which comprises controlling the plurality of tunable EM scattering elements to deliver the plurality of different information streams to at least two groups of EM receivers, each of the at least two groups of EM receivers having at least two receivers, belonging to two physically separate receiver devices.

In some embodiments, a method of operating a wireless antenna controller includes emitting electromagnetic (EM) radiation of a frequency range with an EM emitter to a plurality of tunable EM scattering elements through a plurality of EM filters. The method also includes passing different sub-ranges of the frequency range to different ones of the plurality of tunable EM scattering elements with the EM filters. The method further includes operating the plurality of tunable EM scattering elements in a plurality of different scattering states responsive to the sub-ranges of the frequency range. The method also includes controlling the EM emitter to modulate frequency content of the EM radiation to cause the plurality of tunable EM scattering elements to operate collectively according to a plurality of different modulation patterns.

In some embodiments, a method includes controlling an EM emitter, which comprises controlling the EM emitter to modulate frequency content of EM radiation over time to vary modulation patterns of plurality of tunable EM scattering elements over time such that the plurality of tunable EM scattering elements scatter an EM reference wave to produce a radiated wave that carries a plurality of different information streams to a plurality of different far-end locations.

In some embodiments, a method includes feeding an EM reference wave to a plurality of tunable EM scattering elements through a feed responsive to a monochromatic continuous wave EM signal at the feed.

In some embodiments, a method includes feeding an EM reference wave to a plurality of tunable EM scattering elements through a feed responsive to a monochromatic continuous wave EM signal at the feed, wherein feeding the EM reference wave to the plurality of tunable EM scattering elements through a feed responsive to a monochromatic continuous wave EM signal at the feed comprises applying a radiofrequency signal to the feed.

In some embodiments, a method includes feeding an EM reference wave to a plurality of tunable EM scattering elements through a feed responsive to a monochromatic continuous wave EM signal at the feed, wherein feeding the EM reference wave to the plurality of tunable EM scattering elements through a feed responsive to a monochromatic continuous wave EM signal at the feed comprises applying a microwave signal to the feed.

In some embodiments, a method includes feeding an EM reference wave to a plurality of tunable EM scattering elements through a feed responsive to a monochromatic continuous wave EM signal at the feed, wherein feeding the EM reference wave to the plurality of tunable EM scattering elements through a feed responsive to a monochromatic continuous wave EM signal at the feed comprises applying a millimeter wave signal to the feed.

In some embodiments, a method includes feeding an EM reference wave to a plurality of tunable EM scattering elements through a feed responsive to a modulated EM signal at the feed.

In some embodiments, a method includes controlling an EM emitter to modulate frequency content of EM radiation, which comprises modulating the frequency content of the EM radiation to modulate a plurality of tunable EM scattering elements at a time scale that is longer than a time that it takes for a radiated wave to travel from the plurality of tunable EM scattering elements to a plurality of different far-end locations.

In some embodiments, a method includes controlling an EM emitter to modulate frequency content of EM radiation, which comprises modulating the plurality of tunable EM scattering elements at a time scale that is shorter than a time that it takes for the radiated wave to travel from the plurality of optically tunable EM scattering elements to the plurality of different far-end locations.

In some embodiments, a method includes controlling an EM emitter to modulate frequency content of EM radiation, which comprises modulating a plurality of tunable EM scattering elements as a temporal series of modulation patterns, wherein at least a portion of the modulation patterns of the temporal series is determined by solving a time variant holographic projection manifold function.

In some embodiments, a method includes solving a time variant holographic projection manifold function, which comprises solving the time variant holographic projection manifold function using a retarded Green's function.

In some embodiments, a method includes controlling an EM emitter to modulate frequency content of EM radiation, which comprises modulating a radiated wave over time to deliver a plurality of different frequency modulated information streams to a plurality of different far-end locations.

In some embodiments, a method includes controlling an EM emitter to modulate frequency content of EM radiation, which comprises modulating a radiated wave over time to deliver a plurality of different amplitude modulated information streams to a plurality of different far-end locations.

In some embodiments, a method includes controlling an EM emitter to modulate frequency content of EM radiation, which comprises modulating a radiated wave over time to deliver a plurality of different phase modulated information streams to a plurality of different far-end locations.

In some embodiments, a method includes controlling an EM emitter to modulate frequency content of EM radiation, which comprises modulating a radiated wave over time to deliver a plurality of different quadrature amplitude modulated (QAM) data streams to a plurality of different far-end locations.

In some embodiments, a method includes controlling an EM emitter to modulate frequency content of EM radiation, which comprises modulating a radiated wave over time to deliver a plurality of different analog modulated information streams to a plurality of different far-end locations.

In some embodiments, a method includes controlling an EM emitter to modulate frequency content of EM radiation, which comprises modulating a radiated wave over time to deliver a plurality of different digital modulated data streams to a plurality of different far-end locations.

In some embodiments, a method includes controlling an EM emitter to modulate frequency content of EM radiation, which comprises modulating a radiated wave over time to deliver a plurality of different spread spectrum modulated data streams to a plurality of different far-end locations.

In some embodiments, a method includes controlling an EM emitter to produce a radiated wave that carries a plurality of different information streams to a plurality of different far-end locations, which comprises controlling the EM emitter to deliver the plurality of different information streams to at least some of the plurality of different far-end locations coinciding with EM receivers.

In some embodiments, a method includes controlling an EM emitter to produce a radiated wave that carries a plurality of different information streams to a plurality of different far-end locations, which comprises controlling the EM emitter to deliver the plurality of different information streams to at least two of the EM receivers comprising multiple input, multiple output (MIMO) receiver devices.

In some embodiments, a method includes controlling an EM emitter to produce a radiated wave that carries a plurality of different information streams to a plurality of different far-end locations, which comprises controlling the EM emitter to deliver the plurality of different information streams to at least two groups of at least two of the EM receivers comprising MIMO receiver devices.

In some embodiments, a method includes controlling an EM emitter to produce a radiated wave that carries a plurality of different information streams to a plurality of different far-end locations, which comprises controlling the EM emitter to deliver the plurality of different information streams to at least two EM receivers belonging to two physically separate receiver devices.

In some embodiments, controlling the EM emitter to produce a radiated wave that carries a plurality of different information streams to a plurality of different far-end locations comprises controlling the EM emitter to deliver the plurality of different information streams to at least two groups of the EM receivers, of the EM receivers having at least two receivers, belonging to two physically separate receiver devices.

In some embodiments, a method includes operating a plurality of tunable EM scattering elements, which comprises controlling each of the plurality of tunable EM scattering elements separately.

In some embodiments, a method includes operating a plurality of tunable EM scattering elements, which comprises operating each of the plurality of tunable EM scattering elements in more than two different scattering states.

In some embodiments, a method includes operating a plurality of tunable EM scattering elements, which comprises transitioning the plurality of tunable EM scattering elements between different holograms gradually.

In some embodiments, a method includes passing different sub-ranges of a frequency range, which comprises passing a sub-range of the EM radiation with each of the plurality of EM filters that is orthogonal to other sub-ranges of the EM radiation passed by others of the plurality of EM filters.

In some embodiments, a method includes passing different sub-ranges of the frequency range, which comprises passing a sub-range of the EM radiation with each of a plurality of EM filters comprising a continuous frequency segment of the frequency range.

In some embodiments, a method includes passing different sub-ranges of a frequency range, which comprises passing orthogonal frequency division multiplexing (OFDM) defined sub-ranges of the EM radiation with each of a plurality of EM filters.

In some embodiments, a method includes passing different sub-ranges of a frequency range, which comprises passing code division multiplexing (CDM) defined sub-ranges of EM radiation with each of a plurality of EM filters.

In some embodiments, a method includes emitting EM radiation of a frequency range, which comprises emitting the EM radiation with the frequency range having a lowest frequency that is at least about twice a frequency of a reference wave a plurality of tunable EM scattering elements is configured to scatter to form a radiated wave.

In some embodiments, a method includes emitting EM radiation of a frequency range, which comprises emitting the EM radiation with the frequency range having a lowest frequency that is at least about one terahertz (1 THz).

In some embodiments, a method includes emitting EM radiation of a frequency range, which comprises emitting the EM radiation with the frequency range having a lowest frequency that is at least about one hundred terahertz (100 THz).

In some embodiments, a method includes operating a plurality of tunable EM scattering elements, which comprises operating a plurality of optically tunable EM scattering elements tunable by the sub-ranges of the EM radiation passed by corresponding ones of the plurality of EM filters.

In some embodiments, a method includes operating a plurality of optically tunable EM scattering elements, which comprises operating a plurality of photodiodes.

In some embodiments, a method includes operating a plurality of optically tunable EM scattering elements, which comprises operating a plurality of phototransistors.

In some embodiments, a method includes operating a plurality of optically tunable EM scattering elements, which comprises operating a plurality of photoconductive or photoresistive elements.

In some embodiments, a method includes operating a plurality of optically tunable EM scattering elements, which comprises operating a plurality of phase-change elements configured to reversibly change phase responsive to heat deposition of optical radiation.

In some embodiments, a method includes controlling an EM emitter to modulate frequency content of EM radiation, which comprises modulating a plurality of tunable EM scattering elements at a frequency of at least about one gigahertz (1 GHz).

In some embodiments, a method includes controlling an EM emitter to modulate frequency content of EM radiation, which comprises modulating a plurality of tunable EM scattering elements as a temporal series of modulation patterns, wherein each modulation pattern of the series is determined by solving a time invariant holographic projection manifold function.

In some embodiments, a method includes solving a time invariant holographic projection manifold function, which comprises solving the time invariant holographic projection manifold function using a Green's function.

In some embodiments, a method includes operating a plurality of optically tunable EM scattering elements, which includes operating a metamaterial or a metasurface.

In some embodiments, a method includes operating a waveguide carrying a plurality of tunable EM scattering elements, wherein operating the plurality of tunable EM scattering elements and the waveguide comprises operating a metamaterial or a metasurface.

Figure 4:
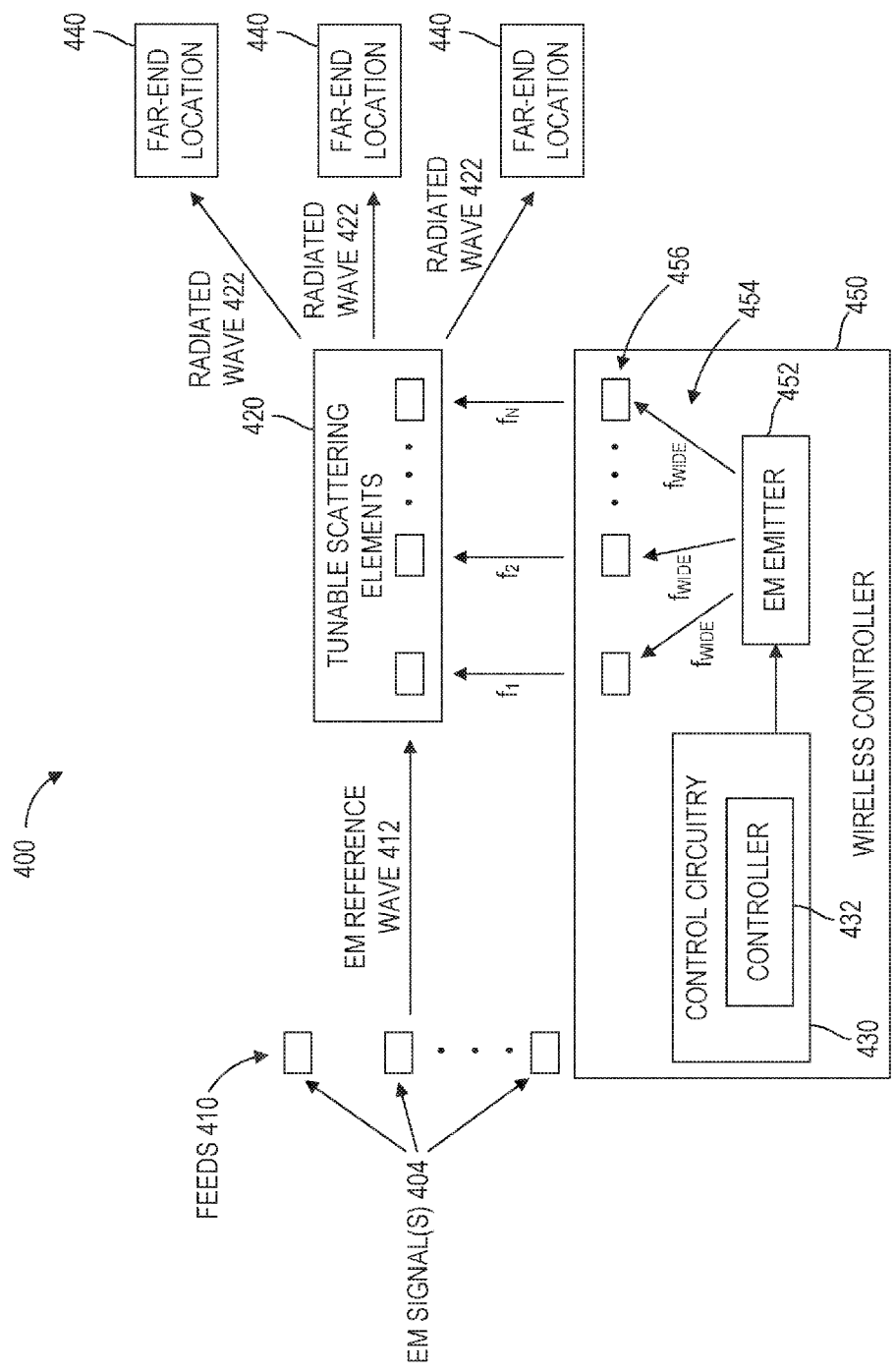
FIG. 4 is a simplified block diagram of an antenna system having a wireless controller, according to some embodiments.

FIG. 4 is a simplified block diagram of an antenna system 400 having a wireless controller 450, according to some embodiments. The antenna system 400 includes one or more feeds 410 configured to receive one or more EM signals 404 and deliver a reference wave 412 to a plurality of tunable EM scattering elements 420. The plurality of tunable EM scattering elements 420 is configured to scatter the reference wave 412 to generate a radiated wave 422. The radiated wave includes a plurality of different information streams that are delivered to a plurality of far-end locations 440. The EM signals 404, the feeds 410 the EM reference wave 412, the tunable scattering elements 420, the radiated wave 422, and the far end locations 440 may be similar to the EM signals 104, the feeds 110, the EM reference wave 112, the tunable EM scattering elements 120, the radiated wave 122, and the far-end locations 140 discussed above with reference to the antenna system 100 of FIG. 1. The antenna system 400, however, includes a wireless controller 450 configured to control the tunable scattering elements 420, and the tunable EM scattering elements 420 are configured to be controlled wirelessly. Otherwise, the discussions corresponding to FIGS. 1-3 above are applicable to the antenna system 400 of FIG. 4.

The wireless controller 450 is configured to wirelessly control the plurality of tunable EM scattering elements 420. The wireless controller 450 is configured to wirelessly control the plurality of tunable EM scattering elements to modulate the radiated wave over 422 time to deliver the plurality of different information streams to the plurality of different far-end locations 440. In other words, the wireless controller 450 is configured to modulate the plurality of tunable EM scattering elements 420 between a plurality of different operational states over time to achieve the plurality of different information streams of the radiated wave 422.

The wireless controller includes an EM emitter 452 configured to controllably emit EM radiation 454 having a wide frequency range $f_{WIDE}$. The wireless controller 450 also includes a plurality of EM filters 456 configured to pass different sub-ranges $f_1, f_2, \ldots, f_N$ of the wide frequency range $f_{WIDE}$ to different ones of the plurality of tunable EM scattering elements 420. The plurality of tunable EM scattering elements 420 are configured, in turn, to operate in the plurality of different operation states (e.g., scattering states) responsive to the sub-ranges $f_1, f_2, \ldots, f_N$. In some embodiments, some of the EM filters 456 may be configured to pass the same sub-ranges $f_1, f_2, \ldots, f_N$ as others of the EM filters 456, especially if the tunable EM scattering elements 420 corresponding thereto are located remotely from each other. In some embodiments, each of the EM filters 456 may be configured to pass different sub-ranges $f_1, f_2, \ldots, f_N$ of the wide frequency range $f_{WIDE}$ of the EM radiation 454.

In some embodiments, the EM emitter 452 and the EM filters 456 may be configured to control each of the EM scattering elements 420 separately (e.g., each one of the EM filters 456 corresponds to a different one of the tunable EM scattering elements 420). In some embodiments, at least one of the EM filters 456 may correspond to more than one of the tunable scattering elements 420, resulting in control of a group of the tunable EM scattering elements 420 by the EM emitter 452 and the EM filter 456 that corresponds to the more than one tunable scattering elements 420.

The wireless controller also includes control circuitry 430 operably coupled to the EM emitter 252. The control circuitry 430 may include a controller 432, which may be similar to the control circuitry 132A (e.g., including a data storage device and a processor) discussed above with reference to FIG. 3. By way of non-limiting example, the controller 432 may be configured to perform at least a portion of the acts discussed below with reference to the methods 500, 600 of FIGS. 5 and 6, respectively.

The control circuitry 430 is configured to control the EM emitter 450 to modulate frequency content of the EM radiation 454 to cause the plurality of tunable EM scattering elements 420 to operate collectively according to a plurality of different modulation patterns. For example, the control circuitry may control the EM emitter 452 to include different portions of a first sub-range $f_1$ of the wide frequency range to control a tunable EM scattering element 420 that corresponds to an EM filter that passes the first sub-range $f_1$. The portion or portions of the first sub-range $f_1$ included in the EM radiation 454 may be selected to cause the tunable EM scattering element 420 to operate in a desired operational state (e.g., scattering state). In other words, the tunable EM scattering elements 420 may be set to operate according to any desired modulation pattern by adjusting the frequency content of the EM radiation 454. In some embodiments, the wireless controller 450 is configured to modulate the tunable EM scattering elements 420 at a frequency of at least about one gigahertz (1 GHz).

In some embodiments, a sub-range $f_1, f_2, \ldots, f_N$ of the EM radiation 454 passed by each of the EM filters 456 is orthogonal to other sub-ranges $f_1, f_2, \ldots, f_N$ of the EM radiation 454 passed by others of the EM filters 456. This is the most general filtering statement one can come up with. Orthogonality can be described using a scalar product. In a general sense, a scalar product of frequency-domain functions can be stated as a double integral:

$$(a,b) = \iint K(f,f') a(f) b(f') df df',$$

where (a,b) is the scalar product of a and b, K(f, f') is an integral kernel. Frequency-division multiplexing (FDM) is a simple case of such orthogonality, with the integral kernel $K(f, f') = \delta(f-f')$ being a delta function of the frequency difference. In FDM embodiments, the sub-ranges $f_1, f_2, \ldots, f_N$ include continuous frequency segments of the wide frequency range $f_{WIDE}$. Also, in some embodiments, the different sub-ranges $f_1, f_2, \ldots, f_N$ include orthogonal frequency division multiplexing (OFDM) defined sub-ranges of the EM radiation 454. Furthermore, in some embodiments, the different sub-ranges $f_1, f_2, \ldots, f_N$ include code division multiplexing (CDM) defined sub-ranges of the EM radiation 454. In FDM embodiments, two signals are orthogonal if and only if their spectral content is non-overlapping. In embodiments of OFDM and CDM, the integral kernel K is not a delta-function, and spectral densities can overlap without violating orthogonality.

In some embodiments, a lowest frequency of the wide frequency range is at least about twice a frequency of the EM reference wave 412. In some embodiments, the lowest frequency in the wide frequency range $f_{WIDE}$ is at least about one terahertz (1 THz, the edge of the far-infrared). In some embodiments, the lowest frequency of the wide frequency range is at least about one hundred terahertz (100 THz, edge of near infrared, or "true" optics). In some embodiments, the wide frequency range $f_{WIDE}$ at least partially overlaps an optical frequency spectrum (e.g., including infrared light, visible light, and ultraviolet light, spanning about 3 THz to about 30 peta Hertz (PHz)). As a result, the tunable EM scattering elements 420 may include optically tunable EM scattering elements (e.g., photodiodes, phototransistors, photoconductive or photo resistive elements, phase change elements configured to reversibly change phase responsive to heat deposition of optical radiation, other scattering elements, or combinations thereof). In practice, few semiconductor-based "photoconductive" elements would actually respond efficiently to less than 100 THz radiation, except by virtue of heating.

Figure 5:
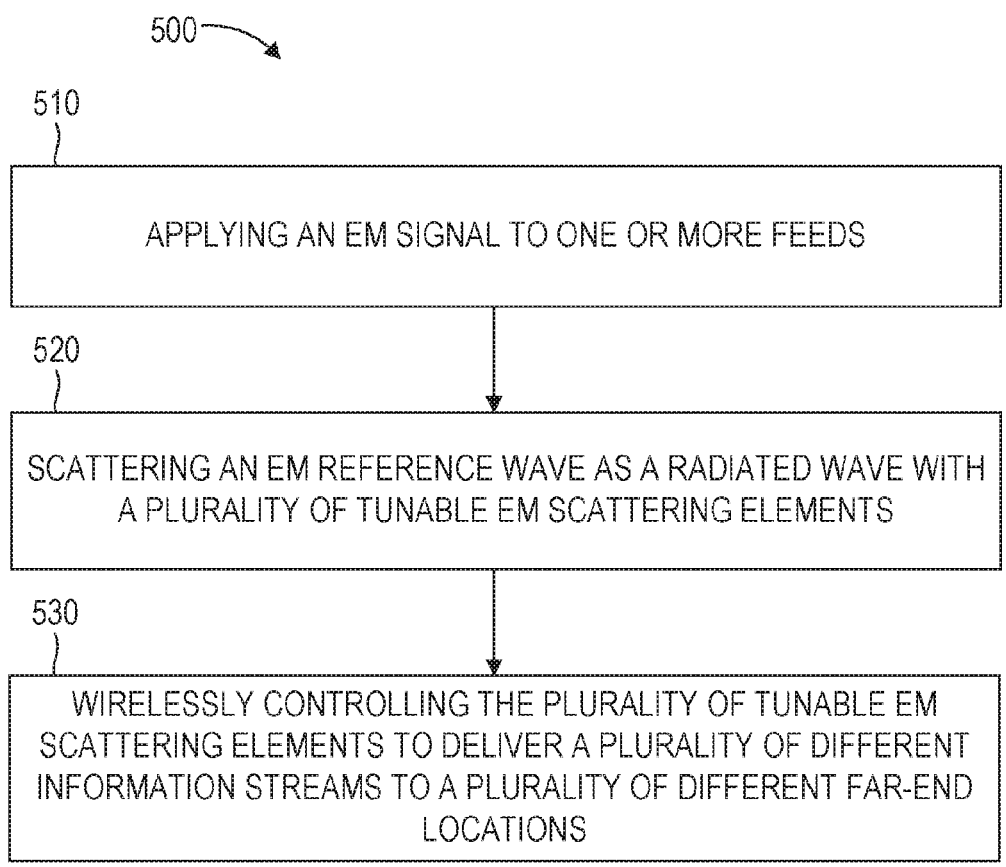
FIG. 5 is a simplified flowchart illustrating a method of operating an antenna system, according to some embodiments.

FIG. 5 is a simplified flowchart illustrating a method 500 of operating an antenna system (e.g., the antenna system 400 of FIG. 4). Referring to FIGS. 4 and 5 together, the method 500 includes applying 510 an EM signal 404 (e.g., a monochromatic continuous wave EM signal, a modulated EM signal, other signals, or combinations thereof) to one or more feeds 410 configured to receive and propagate the EM signal 404 as an EM reference wave 412.

The method 500 also includes scattering 520 the EM reference wave 412 as a radiated wave 422 with a plurality of tunable EM scattering elements 420, each configured to operate in at least two different operational states. In some embodiments, scattering 520 the EM reference wave 412 includes operating each of the tunable EM scattering elements 420 in more than two operational states. In some embodiments, scattering 520 the EM reference wave 412 includes transitioning the antenna system 400 between different holograms gradually.

The method 500 further includes wirelessly controlling 530 the plurality of tunable EM scattering elements 420 with a wireless controller 450 to modulate the radiated wave 422 over time. The plurality of tunable EM scattering elements 420 are modulated over time to deliver a plurality of different information streams to a plurality of different far-end locations 440 by modulating the plurality of tunable EM scattering elements between the plurality of different operational states over time. In some embodiments, wirelessly controlling 530 the tunable EM scattering elements 420 includes controlling each of the tunable EM scattering elements separately.

In some embodiments, wirelessly controlling 530 the plurality of tunable EM scattering elements 420 includes emitting EM radiation 454 encompassing a wide frequency range $f_{WIDE}$ with an emitter of the wireless controller 450, and passing only a portion of the EM radiation 454 with each of a plurality of EM filters 456 corresponding to the plurality of tunable EM scattering elements 420. In such embodiments, wirelessly controlling 530 also includes switching the plurality of tunable EM scattering elements 420 between the at least two different operational states responsive to receiving the portion of the EM radiation 454 passed by the corresponding ones of the plurality of EM filters 456. In some embodiments, passing only a portion of the EM radiation 458 includes passing, with each of the plurality of EM filters 456, only a portion of the EM radiation 454 that is orthogonal to each other portion of the EM radiation 454 passed by others (e.g., some of the others, all of the others) of the plurality of EM filters 456. In some embodiments, passing only a portion of the EM radiation 458 includes passing, with each of the plurality of EM filters 456, a continuous frequency segment of the wide frequency range $f_{WIDE}$. In some embodiments, passing only a portion of the EM radiation 458 includes passing, with each of the plurality of EM filters 456, an OFDM defined portion of the EM radiation 452. In some embodiments, passing only a portion of the EM radiation 458 includes passing, with each of the plurality of EM filters 456, a CDM defined portion of the EM radiation. In some embodiments, emitting EM radiation 454 encompassing a wide frequency range $f_{WIDE}$ includes emitting the EM radiation 454 with the wide frequency range $f_{WIDE}$ having a lowest frequency that is at least about twice a frequency of the EM reference wave 412. In some embodiments, emitting EM radiation 454 encompassing a wide frequency range $f_{WIDE}$ includes emitting the EM radiation 454 with the wide frequency range $f_{WIDE}$ having a lowest frequency that is at least about one terahertz (1 THz). In some embodiments, emitting EM radiation 454 encompassing a wide frequency range $f_{WIDE}$ includes emitting the EM radiation 454 with the wide frequency range $f_{WIDE}$ having a lowest frequency that is at least about one hundred terahertz (100 THz). In some embodiments, wirelessly controlling 530 the plurality of tunable EM scattering elements 420 includes optically controlling a plurality of optically tunable EM scattering elements (e.g., photodiodes, phototransistors, photoconductive or photoresistive elements, phase-change elements configured to reversibly change phase responsive to heat deposition of optical radiation, other optically tunable elements, or combinations thereof) tunable by the portions of the EM radiation 454 passed by the corresponding ones of the plurality of EM filters 456. In some embodiments, optically controlling a plurality of optically tunable EM scattering elements includes modulating the plurality of optically tunable EM scattering elements at a frequency of at least about one gigahertz (1 GHz).

Figure 6:
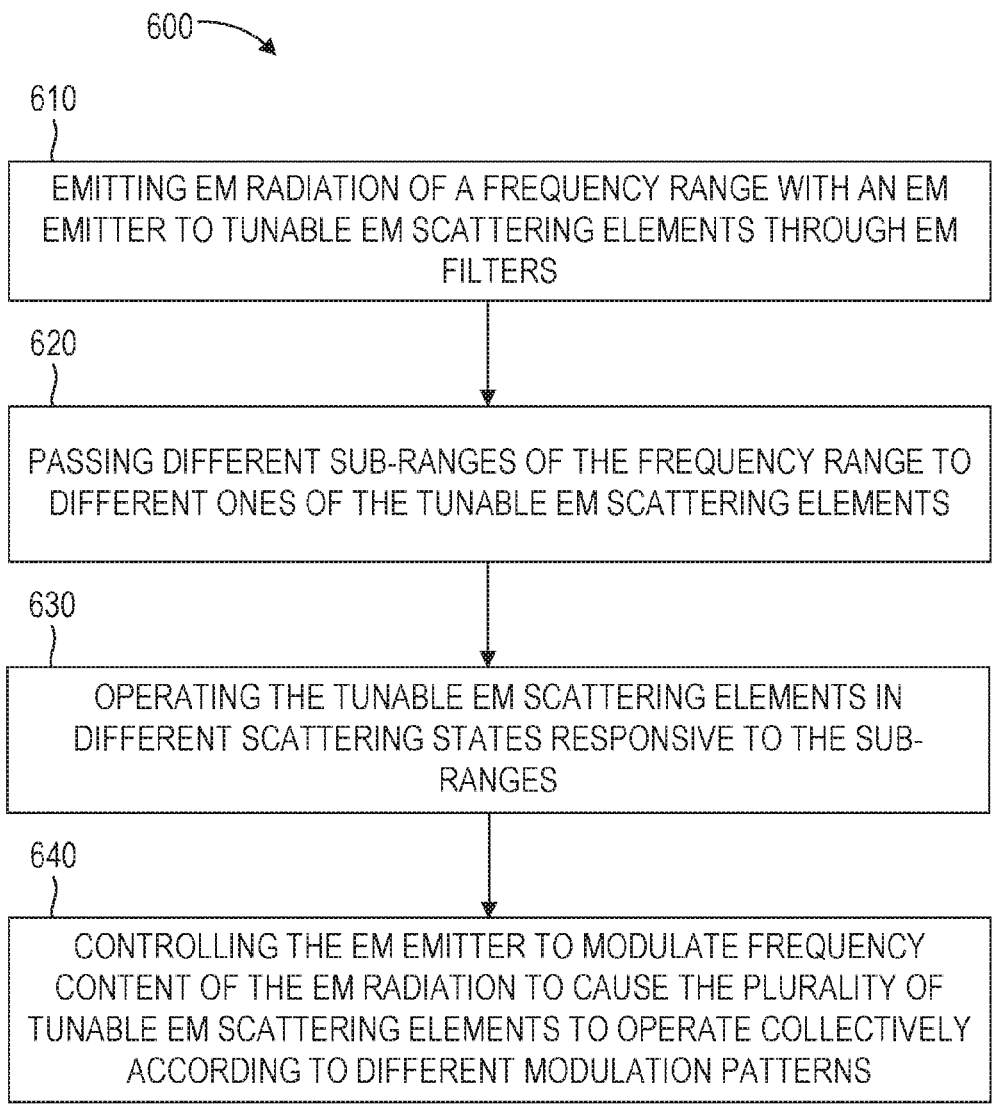
FIG. 6 is a simplified flowchart illustrating a method of operating a wireless antenna controller, according to some embodiments.

FIG. 6 is a simplified flowchart illustrating a method 600 of operating a wireless antenna controller (e.g., the wireless controller 450 of FIG. 4). Referring to FIGS. 4 and 6 together, the method 600 includes emitting 610 EM radiation 454 of a frequency range $f_{WIDE}$ with an EM emitter 452 to a plurality of tunable EM scattering elements 420 through a plurality of EM filters 456. In some embodiments, emitting 610 EM radiation 454 includes controlling the EM emitter 452 to modulate the frequency content of the EM radiation 454 over time to vary the modulation patterns of the tunable EM scattering elements 420 over time such that the tunable EM scattering elements 420 scatter an EM reference wave 412 to produce a radiated wave 422 that carries a plurality of different information streams (e.g., frequency, amplitude, phase, QAM, analog, digital, or spread-spectrum modulated information streams) to a plurality of different far-end locations 440. In some embodiments, emitting 610 EM radiation 454 includes emitting the EM radiation 454 with the frequency range $f_{WIDE}$ having a lowest frequency that is at least about twice a frequency of a reference wave 412 the tunable EM scattering elements 420 are configured to scatter to form the radiated wave 422. In some embodiments, emitting 610 EM radiation 454 includes emitting the EM radiation 454 with the frequency range $f_{WIDE}$ having a lowest frequency that is at least about one terahertz (1 THz). In some embodiments, emitting 610 EM radiation 454 includes emitting the EM radiation 454 with the frequency range $f_{WIDE}$ having a lowest frequency that is at least about one hundred terahertz (100 THz).

The method 600 also includes passing 620 different sub-ranges $f_1, f_2, \ldots, f_N$ of the frequency range $f_{WIDE}$ to different ones of the plurality of tunable EM scattering elements 420 with the EM filters 456. In some embodiments, passing 620 different sub-ranges of the frequency range $f_{WIDE}$ includes passing a sub-range of the EM radiation 454 with each of the EM filters 456 that is orthogonal to other sub-ranges of the EM radiation 454 passed by others of the EM filters 456. In some embodiments, the different sub-ranges passed by each of the EM filters 456 are continuous frequency segments, OFDM defined sub-ranges, CDM defined sub-ranges, or other sub-ranges of the EM radiation 454.

The method 600 further includes operating 630 the plurality of tunable EM scattering elements 420 in a plurality of different scattering states responsive to the sub-ranges $f_1, f_2, \ldots, f_N$ of the frequency range $f_{WIDE}$. In some embodiments, operating 630 the tunable EM scattering elements 420 includes operating each of the tunable EM scattering elements 420 in more than two different scattering states. In some embodiments, operating 630 the tunable EM scattering elements 420 includes transitioning the tunable EM scattering elements 420 between different holograms gradually. In some embodiments, operating 630 the tunable EM scattering elements 420 includes operating optically tunable EM scattering elements (e.g., photodiodes, phototransistors, photoconductive or photoresistive elements, phase-change elements configured to reversibly change phase responsive to heat deposition of optical radiation, etc.) tunable by the sub-ranges $f_1, f_2, \ldots, f_N$ of the EM radiation 454 passed by corresponding ones of the EM filters 456.

The method 600 also includes controlling 640 the EM emitter 452 to modulate frequency content of the EM radiation 454 to cause the plurality of tunable EM scattering elements 420 to operate collectively according to a plurality of different modulation patterns. In some embodiments, controlling 640 the EM emitter 452 includes modulating the frequency content of the EM emitter 452 to modulate the tunable EM scattering elements 420 at a time scale that is longer than it takes for the radiated wave to travel from the tunable EM scattering elements 420 to the plurality of different far-end locations 440. In some embodiments, controlling 640 the EM emitter 452 includes modulating the tunable EM scattering elements at a time scale that is shorter than a time it takes for the radiated wave 422 to travel from the tunable EM scattering elements 420 to the plurality of different far-end locations 440. In some embodiments, controlling 640 the EM emitter 452 includes modulating the tunable EM scattering elements 420 as a temporal series of modulation patterns, wherein at least a portion of the modulation patterns of the temporal series is determined by solving a time variant holographic projection manifold function (e.g., using a retarded Green's function). In some embodiments, controlling 640 the EM emitter 452 to modulate frequency content of the EM radiation 454 includes modulating the tunable EM scattering elements 420 as a temporal series of modulation patterns, wherein each modulation pattern is determined by solving a time invariant holographic projection manifold function (e.g., using a Green's function). In some embodiments, controlling 640 the EM emitter to modulate frequency content of the EM radiation 454 includes modulating the tunable EM scattering elements 420 at a frequency of at least about one gigahertz (1 GHz).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Furthermore, the disclosure contemplates combinations of any of the disclosed embodiments and examples, except as would be incompatible in practice, as would be understood by those skilled in the art.

What is claimed is:

1. An antenna system, comprising:
   one or more feeds configured to receive an electromagnetic (EM) signal and propagate the EM signal as an EM reference wave;
   a plurality of tunable EM scattering elements spaced at sub-wavelength distances compared to the EM reference wave, the plurality of tunable EM scattering elements configured to operate in at least two different operational states to selectively scatter the EM reference wave as a radiated wave; and
   a wireless controller configured to wirelessly control the plurality of tunable EM scattering elements and modulate the radiated wave over time to deliver a plurality of different information streams to a plurality of different far-end locations by modulating the plurality of tunable EM scattering elements between the plurality of different operational states over time;
   a plurality of EM filters corresponding to the plurality of tunable EM scattering elements, wherein:
   the wireless controller includes an EM emitter configured to emit EM radiation encompassing a wide frequency range;
   each of the plurality of EM filters is configured to pass only a portion of the EM radiation encompassing the wide frequency range;
   the plurality of tunable EM scattering elements is configured to switch between the at least two different operational states responsive to receiving the portion of the EM radiation passed by the corresponding ones of the plurality of EM filters; and the wireless controller is configured to vary frequency content of the EM radiation to control the plurality of tunable EM scattering elements to deliver the plurality of different information streams to the plurality of different far-end locations.

2. The antenna system of claim 1, wherein the portion of the EM radiation passed by each of the plurality of EM filters is orthogonal to each other portion of the EM radiation passed by others of the plurality of EM filters.

3. The antenna system of claim 1, wherein the portion of the EM radiation passed by each of the plurality of EM filters comprises a continuous frequency segment of the wide frequency range.

4. The antenna system of claim 1, wherein the portion of the EM radiation passed by each of the plurality of EM filters comprises an orthogonal frequency division multiplexing (OFDM) defined portion of the EM radiation.

5. The antenna system of claim 1, wherein the portion of the EM radiation passed by each of the plurality of EM filters comprises a code division multiplexing (CDM) defined portion of the EM radiation.

6. The antenna system of claim 1, wherein a lowest frequency in the wide frequency range is at least about twice a frequency of the reference wave.

7. The antenna system of claim 1, wherein a lowest frequency in the wide frequency range is at least about one terahertz (1 THz).

8. The antenna system of claim 1, wherein a lowest frequency in the wide frequency range is at least about one hundred terahertz (100 THz).

9. The antenna system of claim 1, wherein the plurality of tunable EM scattering elements includes a plurality of optically tunable EM scattering elements tunable by the portions of the EM radiation passed by the corresponding ones of the plurality of EM filters.

10. The antenna system of claim 9, wherein the plurality of optically tunable EM scattering elements comprises a plurality of photodiodes.

11. The antenna system of claim 9, wherein the plurality of optically tunable EM scattering elements comprises a plurality of phototransistors.

12. The antenna system of claim 9, wherein the plurality of optically tunable EM scattering elements comprises a plurality of photoconductive or photoresistive elements.

13. The antenna system of claim 9, wherein the plurality of optically tunable EM scattering elements comprises a plurality of phase-change elements configured to reversibly change phase responsive to heat deposition of optical radiation.

14. The antenna system of claim 9, wherein the wireless controller is configured to modulate the plurality of optically tunable EM scattering elements at a frequency of at least about one (1) gigahertz.

15. A wireless antenna controller, comprising:

an electromagnetic (EM) emitter configured to controllably emit EM radiation of a frequency range to a plurality of tunable EM scattering elements through a plurality of EM filters configured to pass different sub-ranges of the frequency range to different ones of the plurality of tunable EM scattering elements, the plurality of tunable EM scattering elements configured to operate in a plurality of different scattering states responsive to the sub-ranges of the frequency range; and control circuitry operably coupled to the EM emitter, the control circuitry comprising at least one data storage device including computer-readable instructions stored thereon and at least one processor operably coupled to the at least one data storage device and configured to execute the computer-readable instructions, wherein the computer-readable instructions are configured to instruct the at least one processor to control the EM emitter to modulate frequency content of the EM radiation to cause the plurality of tunable EM scattering elements to operate collectively according to a plurality of different modulation patterns.

16. The wireless antenna controller of claim 15, wherein the computer-readable instructions are configured to instruct the at least one processor to control the EM emitter to modulate the frequency content of the EM radiation over time to vary the modulation patterns of the plurality of tunable EM scattering elements over time such that the plurality of tunable EM scattering elements scatter an EM reference wave to produce a radiated wave that carries a plurality of different information streams to a plurality of different far-end locations.

17. The wireless antenna controller of claim 15, wherein a sub-range of the EM radiation passed by each of the plurality of EM filters is orthogonal to other sub-ranges of the EM radiation passed by others of the plurality of EM filters.

18. The wireless antenna controller of claim 15, wherein a sub-range of the EM radiation passed by each of the plurality of EM filters comprises a continuous frequency segment of the frequency range.

19. The wireless antenna controller of claim 15, wherein the different sub-ranges of the EM radiation passed by each of the plurality of EM filters comprise orthogonal frequency division multiplexing (OFDM) defined sub-ranges of the EM radiation.

20. The wireless antenna controller of claim 15, wherein the different sub-ranges of the EM radiation passed by each of the plurality of EM filters comprise code division multiplexing (CDM) defined sub-ranges of the EM radiation.

21. The wireless antenna controller of claim 15, wherein a lowest frequency in the frequency range is at least about twice a frequency of a reference wave the plurality of tunable EM scattering elements is configured to scatter to form a radiated wave.

22. The wireless antenna controller of claim 15, wherein a lowest frequency in the frequency range is at least about one terahertz (1 THz).

23. The wireless antenna controller of claim 15, wherein a lowest frequency in the frequency range is at least about one hundred terahertz (100 THz).

24. The wireless antenna controller of claim 15, wherein the plurality of tunable EM scattering elements includes a plurality of optically tunable EM scattering elements tunable by the sub-ranges of the EM radiation passed by corresponding ones of the plurality of EM filters.

25. The wireless antenna controller of claim 24, wherein the plurality of optically tunable EM scattering elements comprises a plurality of photodiodes.

26. The wireless antenna controller of claim 24, wherein the plurality of optically tunable EM scattering elements comprises a plurality of phototransistors.

27. The wireless antenna controller of claim 24, wherein the plurality of optically tunable EM scattering elements comprises a plurality of photoconductive or photoresistive elements.

28. The wireless antenna controller of claim 24, wherein the plurality of optically tunable EM scattering elements comprises a plurality of phase-change elements configured to reversibly change phase responsive to heat deposition of optical radiation.

29. A method of operating an antenna system, the method comprising:
applying an electromagnetic (EM) signal to one or more feeds configured to receive and propagate the EM signal as an EM reference wave;
scattering the EM reference wave as a radiated wave with a plurality of tunable EM scattering elements spaced at sub-wavelength distances compared to the EM reference wave, the plurality of tunable EM scattering elements configured to operate in at least two different operational states; and
wirelessly controlling the plurality of tunable EM scattering elements with a wireless controller to modulate the radiated wave over time to deliver a plurality of different information streams to a plurality of different far-end locations by modulating the plurality of tunable EM scattering elements between the plurality of different operational states over time;
wherein wirelessly controlling the plurality of tunable EM scattering elements comprises:
emitting EM radiation encompassing a wide frequency range with an EM emitter of the wireless controller;
passing only a portion of the EM radiation encompassing the wide frequency range with each of a plurality of EM filters corresponding to the plurality of tunable EM scattering elements;
switching the plurality of tunable EM scattering elements between the at least two different operational states responsive to receiving the portion of the EM radiation passed by the corresponding ones of the plurality of EM filters; and
varying frequency content of the EM radiation to control the plurality of tunable EM scattering elements to deliver the plurality of different information streams to the plurality of different far-end locations.

30. The method of claim 29, wherein passing only a portion of the EM radiation encompassing the wide frequency range comprises passing, with each of the plurality of EM filters, only a portion of the EM radiation that is orthogonal to each other portion of the EM radiation passed by others of the plurality of EM filters.

31. The method of claim 29, wherein passing only a portion of the EM radiation encompassing the wide frequency range comprises passing, with each of the plurality of EM filters, a continuous frequency segment of the wide frequency range.

32. The method of claim 29, wherein passing only a portion of the EM radiation encompassing the wide frequency range comprises passing, with each of the plurality of EM filters, an orthogonal frequency division multiplexing (OFDM) defined portion of the EM radiation.

33. The method of claim 29, wherein passing only a portion of the EM radiation encompassing the wide frequency range comprises passing, with each of the plurality of EM filters, a code division multiplexing (CDM) defined portion of the EM radiation.

34. The method of claim 29, wherein emitting EM radiation encompassing a wide frequency range comprises emitting the EM radiation with the wide frequency range having a lowest frequency that is at least about twice a frequency of the reference wave.

35. The method of claim 29, wherein emitting EM radiation encompassing a wide frequency range comprises emitting the EM radiation with the wide frequency range having a lowest frequency that is at least about one terahertz (1 THz).

36. The method of claim 29, wherein emitting EM radiation encompassing a wide frequency range comprises emitting the EM radiation with the wide frequency range having a lowest frequency that is at least about one hundred terahertz (100 THz).

37. The method of claim 29, wherein wirelessly controlling the plurality of tunable EM scattering elements comprises optically controlling a plurality of optically tunable EM scattering elements tunable by the portions of the EM radiation passed by the corresponding ones of the plurality of EM filters.

* * * * *